(12) United States Patent
Garg et al.

(10) Patent No.: US 12,008,738 B2
(45) Date of Patent: Jun. 11, 2024

(54) DEFOCUS BLUR REMOVAL AND DEPTH ESTIMATION USING DUAL-PIXEL IMAGE DATA

(71) Applicant: Google LLC, Mountain View, CA (US)

(72) Inventors: Rahul Garg, Sunnyvale, CA (US); Neal Wadhwa, Cambridge, MA (US); Pratul Preeti Srinivasan, San Francisco, CA (US); Tianfan Xue, Sunnyvale, CA (US); Jiawen Chen, San Ramon, CA (US); Shumian Xin, Pittsburgh, PA (US); Jonathan T. Barron, Alameda, CA (US)

(73) Assignee: Google LLC, Mountain View, CA (US)

( * ) Notice: Subject to any disclaimer, the term of this patent is extended or adjusted under 35 U.S.C. 154(b) by 384 days.

(21) Appl. No.: 17/626,069

(22) PCT Filed: Nov. 13, 2020

(86) PCT No.: PCT/US2020/060517
§ 371 (c)(1),
(2) Date: Jan. 11, 2022

(87) PCT Pub. No.: WO2022/103400
PCT Pub. Date: May 19, 2022

(65) Prior Publication Data
US 2022/0375042 A1    Nov. 24, 2022

(51) Int. Cl.
*G06T 5/73* (2024.01)
*G06T 5/50* (2006.01)
*G06T 7/50* (2017.01)

(52) U.S. Cl.
CPC .............. *G06T 5/73* (2024.01); *G06T 5/50* (2013.01); *G06T 7/50* (2017.01)

(58) Field of Classification Search
CPC .... G06T 5/73; G06T 5/50; G06T 7/50; G06T 7/55; G06T 5/77; G06F 17/10; G06N 3/02
See application file for complete search history.

(56) References Cited

U.S. PATENT DOCUMENTS

| | | | |
|---|---|---|---|
| 2016/0295098 A1 | 10/2016 | Li et al. | |
| 2018/0139378 A1* | 5/2018 | Moriuchi | ............. G06T 7/571 |
| 2020/0226419 A1 | 7/2020 | Knaan et al. | |

FOREIGN PATENT DOCUMENTS

JP        2018077190        5/2018

OTHER PUBLICATIONS

Abuolaim et al., "Defocus deblurring using dual-pixel data," European Conference on Computer Vision, arXiv:2005.00305v3, Jul. 16, 2020, 27 pages.

(Continued)

*Primary Examiner* — Samir A Ahmed
(74) *Attorney, Agent, or Firm* — McDonnell Boehnen Hulbert & Berghoff LLP

(57) ABSTRACT

A method includes obtaining dual-pixel image data that includes a first sub-image and a second sub-image, and generating an in-focus image, a first kernel corresponding to the first sub-image, and a second kernel corresponding to the second sub-image. A loss value may be determined using a loss function that determines a difference between (i) a convolution of the first sub-image with the second kernel and (ii) a convolution of the second sub-image with the first kernel, and/or a sum of (i) a difference between the first sub-image and a convolution of the in-focus image with the first kernel and (ii) a difference between the second sub-image and a convolution of the in-focus image with the second kernel. Based on the loss value and the loss function, (Continued)

the in-focus image, the first kernel, and/or the second kernel, may be updated and displayed.

20 Claims, 10 Drawing Sheets

(56) References Cited

OTHER PUBLICATIONS

Abuolaim et al., "Revisiting Autofocus for Smartphone Cameras," European Conference on Computer Vision, 2018, 15 pages.
Ansari et al., "Wireless Software Synchronization of Multiple Distributed Cameras," IEEE International Conference on Computational Photography, arXiv:1812.09366v2, Jun. 11, 2019, 12 pages.
Atapour-Abarghouei et al., Real-Time Monocular Depth Estimation Using Synthetic Data with Domain Adaptation via Image Style Transfer, IEEE/CVF Conference on Computer Vision and Pattern Recognition, 2018, 11 pages.
Barron, Jonathan T. Barron, A General and Adaptive Robust Loss Function, IEEE/CVF Conference on Computer Vision and Pattern Recognition, arXiv:1701.03077v10, Apr. 4, 2019, 19 pages.
Barron et al., Shape, Albedo, and Illumination from a Single Image of an Unknown Object, IEEE/CVF Conference on Computer Vision and Pattern Recognition, 2012, 13 pages.
Bitterli et al., "Reversible Jump Metropolis Light Transport using Inverse Mappings," ACM Transactions on Graphics, 2017, 12 pages.
Bradbury et al., "JAX: composable transformations of Python+ NumPy programs," http://github.com/google/jax, 2018, 12 pages.
Chen et al., "Blur-aware Disparity Estimation from Defocus Stereo Images," IEEE/CVF International Conference on Computer Vision, 2015, pp. 855-863.
Choi et al, Depth Analogy: Data-driven Approach for Single Image Depth Estimation using Gradient Samples, IEEE Transactions on Image Processing, 2015, 13 pages.
D'Andrès et al., "Non-parametric Blur Map Regression for Depth of Field Extension," IEEE Transactions on Image Processing, 2016, 14 pages.
Dual pixel capture app. https://github.com/google-research/google-research/tree/master/dual_pixels, 2019, 4 pages.
Eigen et al., "Depth Map Prediction from a Single Image using a Multi-Scale Deep Network," Advances in Neural Information Processing Systems, arXiv:1406.2283v1, Jun. 9, 2014, 9 pages.
Facil et al., "Cam-Convs: Camera-Aware Multi-Scale Convolutions for Single-View Depth," IEEE/CVF Conference on Computer Vision and Pattern Recognition, 2019, pp. 11826-11835.
Favaro, Paolo, "Recovering thin structures via nonlocal-means regularization with application to depth from defocus," IEEE/CVF Computer Society Conference on Computer Vision and Pattern Recognition, Jun. 13-18, 2010, 3 pages (abstract).
Fu et al., "Deep Ordinal Regression Network for Monocular Depth Estimation," IEEE/CVF Conference on Computer Vision and Pattern Recognition, arXiv:1806.02446v1, Jun. 6, 2018, 10 pages.
Garg et al., "Learning Single Camera Depth Estimation using Dual-Pixels," IEEE/CVF International Conference on Computer Vision, 2019, pp. 7628-7637.
Garg et al., "Unsupervised CNN for Single View Depth Estimation: Geometry to the Rescue," European Conference on Computer Vision, arXiv:1603.04992v2, Jul. 29, 2016, 16 pages.
Godard et al., Digging Into Self-Supervised Monocular Depth Estimation, IEEE/CVF International Conference on Computer Vision, arXiv:1806.01260v4, Aug. 17, 2019, 18 pages.
Godard et al., "Unsupervised Monocular Depth Estimation with Left-Right Consistency," IEEE/CVF Conference on Computer Vision and Pattern Recognition, arXiv:1609.03677v3, Apr. 12, 2017, 14 pages.
Guo et al., "Learning Monocular Depth by Distilling Cross-domain Stereo Networks," European Conference on Computer Vision, arXiv:1808.06586v1, Aug. 20, 2018, 22 pages.

Háne et al., "Direction Matters: Depth Estimation with a Surface Normal Classifier," IEEE/CVF Conference on Computer Vision and Pattern Recognition, 2015, 9 pages.
Hasinoff et al., Noise-Optimal Capture for High Dynamic Range Photography, IEEE/CVF Conference on Computer Vision and Pattern Recognition, 2010, 8 pages.
Hasinoff et al., "Burst photography for high dynamic range and low-light imaging on mobile cameras," ACM Transactions on Graphics, 2016, 12 pages.
Harizbas et al, Deep depth from focus. Asian Conference on Computer Vision, arXiv:1704.01085v3, Oct. 28, 2018, 23 pages.
He et al., "Guided Image Filtering," European Conference on Computer Vision, 2010, 14 pages.
Helicon focus. https://www.heliconsoft.com, Helicon Soft Ltd. 2000-2022, 2 pages.
Herrmann et al., "Learning to Autofocus," IEEE/CVF Conference on Computer Vision and Pattern Recognition, arXiv:2004.12260v3, May 2, 2020, 23 pages.
Hoiem et al., "Automatic Photo Pop-up," ACM Transactions on Graphics, 2005, 8 pages.
Jiang et al., Self-Supervised Depth Learning for Urban Scene Understanding, European Conference on Computer Vision, arXiv:1712.04850v2, Apr. 2, 2018, 17 pages.
Karaali et al., "Edge-Based Defocus Blur Estimation With Adaptive Scale Selection," IEEE Transactions on Image Processing, Mar. 2018, vol. 23, Issue 3, 3 pages (Abstract).
Kingma et al., "ADAM: A Method For Stochastic Optimization," International Conference on Learning Representations, arXiv:1412.6989v9, Jan. 30, 2017, published as conference paper at ICLR 2015, 15 pages.
Konrad et al., Learning-Based, Automatic 2D-to-3D Image and Video Conversion, IEEE Transactions on Image Processing, 2013, 3 pages, vol. 22, Issue 9 (Abstract).
Kundu et al., "AdaDepth: Unsupervised Content Congruent Adaptation for Depth Estimation," IEEE/CVF Conference on Computer Vision and Pattern Recognition, arXiv:1803:01599v2, Jun. 7, 2018, 10 pages.
Ladicky et al., "Pulling Things out of Perspective," IEEE/CVF Conference on Computer Vision and Pattern Recognition, 2014, 8 pages.
Lee et al., "Deep Defocus Map Estimation using Domain Adaptation," IEEE/CVF Conference on Computer Vision and Pattern Recognition, Jun. 2019, pp. 12222-12230.
Levin et al., "Understanding Blind Deconvolution Algorithms," IEEE Transactions on Pattern Analysis and Machine Intelligence, Dec. 2011, 2 pages, vol. 33, Issue 12 (Abstract).
Li et al., "DEPT: Depth Estimation by Parameter Transfer for Ssingle Still Images," Asian Conference on Computer Vision, 2014, 14 pages.
Li et al., "Dual Focus Stereo Imaging," Journal of Electronic Imaging, 2010, 17 pages.
Li et al., "A Two-Streamed Network for Estimating Fine-Scaled Depth Maps from Single RGB Images," IEEE/CVF International Conference on Computer Vision, arXiv:1607.00730v4, Dec. 4, 2017, 9 pages.
Liu et al., "Learning Depth from Single Monocular Images Using Deep Convolutional Neural Fields," IEEE Transactions on Pattern Analysis and Machine Intelligence, arXiv:1502.07411v6, Nov. 25, 2015, 16 pages.
Ljung et al., "State of the Art in Transfer Functions for Direct Volume Rendering," Eurographics Conference on Visualization, 2016, 25 pages, vol. 35, No. 3.
Mahjourian et al., "Unsupervised Learning of Depth and Ego-Motion from Monocular Video Using 3D Geometric Constraints," IEEE/CVF Conference on Computer Vision and Pattern Recognition, arXiv:1802.05522v2, Jun. 9, 2018, 9 pages.
Mannan et al., "Blur Calibration for Depth from Defocus," Conference on Computer and Robot Vision, 2016, 8 pages.
Mayer et al., "What Makes Good Synthetic Training Data for Learning Disparity and Optical Flow Estimation?" International Journal of Computer Vision, arXiv:1801.06397, Mar. 22, 2018, 24 pages.

(56) References Cited

OTHER PUBLICATIONS

Michaeli et al., "Blind Deblurring Using Internal Patch Recurrence," European Conference on Computer Vision, 2014, 16 pages.
Mildenhall et al., NeRF: Representing Scenes as Neural Radiance Fields for View Synthesis, European Conference on Computer Vision, 2020, 8 pages.
Park et al., "A Unified Approach of Multi-scale Deep and Hand-crafted Features for Defocus Estimation," IEEE/CVF Conference on Computer Vision and Pattern Recognition, arXiv:1704.08992v1, Apr. 28, 2017, 10 pages.
Punnappurath et al., "Modeling Defocus-Disparity in Dual-Pixel Sensors," IEEE International Conference on Computational Photography, 2020, 12 pages.
Punnappurath et al., "Reflection Removal Using a Dual-Pixel Sensor," IEEE/CVF Conference on Computer Vision and Pattern Recognition, 2019, pp. 1556-1565.
Abuolaim et al., "Defocus Deblurring Using Dual-Pixel Data," Advances in Intelligent Data Analysis XIX, Lecture Notes in Computer Science, Nov. 7, 2020, pp. 111-126.
Garg et al., "Learning Single Camera Depth Estimation Using Dual-Pixels," 2019 IEEE/CVF International Conference on Computer Vision, Oct. 27, 2019, pp. 7627-7636.
International Searching Authority, International Search Report and Written Opinion mailed Sep. 2, 2021, issued in connection with International Patent Application No. PCT/US2020/060517 filed on Nov. 13, 2020, 15 pages.
Punnappurath et al., "Modeling Defocus-Disparity in Dual-Pixel Sensors," 2020 IEEE International Conference on Computational Photography (ICCP), Apr. 24, 2020, pp. 1-12.
Wadhwa et al., "Synthetic Depth-of-Field with a Single-Camera Mobile Phone," Cornell University Library, arXiv:1806:04171 Jun. 11, 2018, 18 pages.
"Total variation denoising," Wikipedia, Sep. 17, 2020, 5 pages.
Ulyanov et al., "Deep Image Prior," Cornell University Library, arXiv:1711.10925 Nov. 29, 2017, 23 pages.
Ren et al., "Neural Blind Deconvolution Using Deep Priors," Cornell University Library, arXiv:1908.02197 Aug. 6, 2019, 10 pages.
Rantfl et al., "Towards Robust Monocular Depth Estimation: Mixing Datasets for Zero-shot Cross-Dataset Transfer," IEEE Transactions on Pattern Analysis and Machine Intelligence, arXiv:1907.01341v3, Aug. 25, 2020, 14 pages.
Rantfl et al., "Dense Monocular Depth Estimation in Complex Dynamic Scenes," IEEE/CVF Conference on Computer Vision and Pattern Recognition, 2016, pp. 4059-4066.
Roy et al., "Monocular Depth Estimation Using Neural Regression Forest," IEEE/CVF Conference on Computer Vision and Pattern Recognition, 2016, pp. 5506-5514.
Shi et al.. "Break Ames Room Illusion: Depth from General Single Images," ACM Transactions on Graphics, Nov. 2015, 11 pages, vol. 34, No. 6, Article 225.
Shi et al., "Just Noticeable Defocus Blur Detection and Estimation," IEEE/CVF Conference on Computer Vision and Pattern Recognition, 2015, pp. 657-665.
Silberman et al., "Indoor Segmentation and Support Inference from RGBD Images," European Conference on Computer Vision, 2012, 14 pages.
Srinivasan et al., "Aperture Supervision for Monocular Depth Estimation," IEEE/CVF Conference on Computer Vision and Pattern Recognition, arXiv:1711.07933v2, Mar. 29, 2018, 13 pages.
Suwajankorn et al., "Depth from Focus with Your Mobile Phone," IEEE/CVF Conference on Computer Vision and Pattern Recognition, 2015, pp. 3497-3506.
Tang et al., "Depth from Defocus in the Wild," IEEE/CVF Conference on Computer Vision and Pattern Recognition, 2017, pp. 2740-2748.
Tang et al., "Utilizing Optical Aberrations for Extended-Depth-of-Field Panoramas," Asian Conference on Computer Vision, 2012, 14 pages.
Tucker et al., "Single-view View Synthesis with Multiplane Images," IEEE/CVF Conference on Computer Vision and Pattern Recognition, arXiv:2004.11364v1, Apr. 23, 2020, 10 pages.
Wadhwa et al., "Synthetic Depth-of-Field with a Single-Camera Mobile Phone," ACM Transactions on Graphics, 2018, 18 pages, vol. 37, No. 4, Article 64.
Wang et al., "A New Alternating Minimization Algorithm for Total Variation Image Reconstruction," SIAM Journal on Imaging Sciences, 2008, 24 pages.
Xin et al., "Defocus Map Estimation and Deblurring from a Single Dual-Pixel Image," Project website, 2021. https://imaging.cs.cmu.edu/dual_pixels, 10 pages.
Zhang et al., "Learning Fully Convolutional Networks for Iterative Non-blind Deconvolution," IEEE/CVF Conference on Computer Vision and Pattern Recognition, 2017, pp. 3817-3825.
Zhang et al., "Du2Net: Learning Depth Estimation from Dual-Cameras and Dual-Pixels," European Conference on Computer Vision, arXiv:2003.14299v1, Mar. 31, 2020, 32 pages.
Zhou et al., "Unsupervised Learning of Depth and Ego-Motion from Video," IEEE/CVF Conference on Computer Vision and Pattern Recognition, arXiv:1704.07813v2, Aug. 2017, 10 pages.
Zhou et al., "Stereo Magnification: Learning view synthesis using multiplane images," ACM Transactions on Graphics, arXiv:1805.09817, 2018, 12 pages, vol. 37, No. 4, Article 65.
Zou et al., "DF-Net: Unsupervised Joint Learning of Depth and Flow using Cross-Task Consistency," European Conference on Computer Vision, arXiv:1809.01649v1, Sep. 5, 2018, 18 pages.
Intellectual Property India, Examination Report mailed on Nov. 22, 2023, issued in connection with Indian Patent Application No. 202227005325, 7 pages.

\* cited by examiner

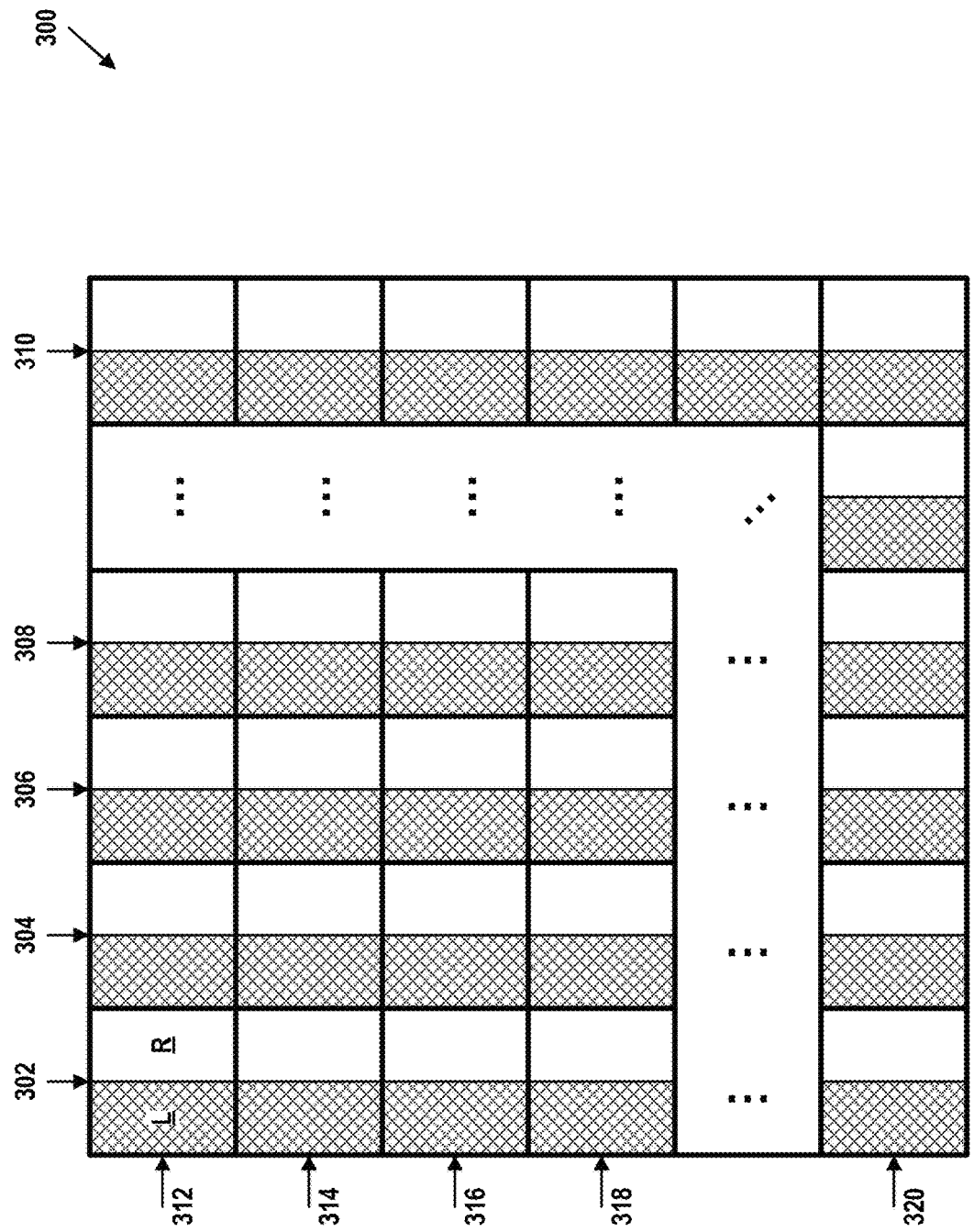

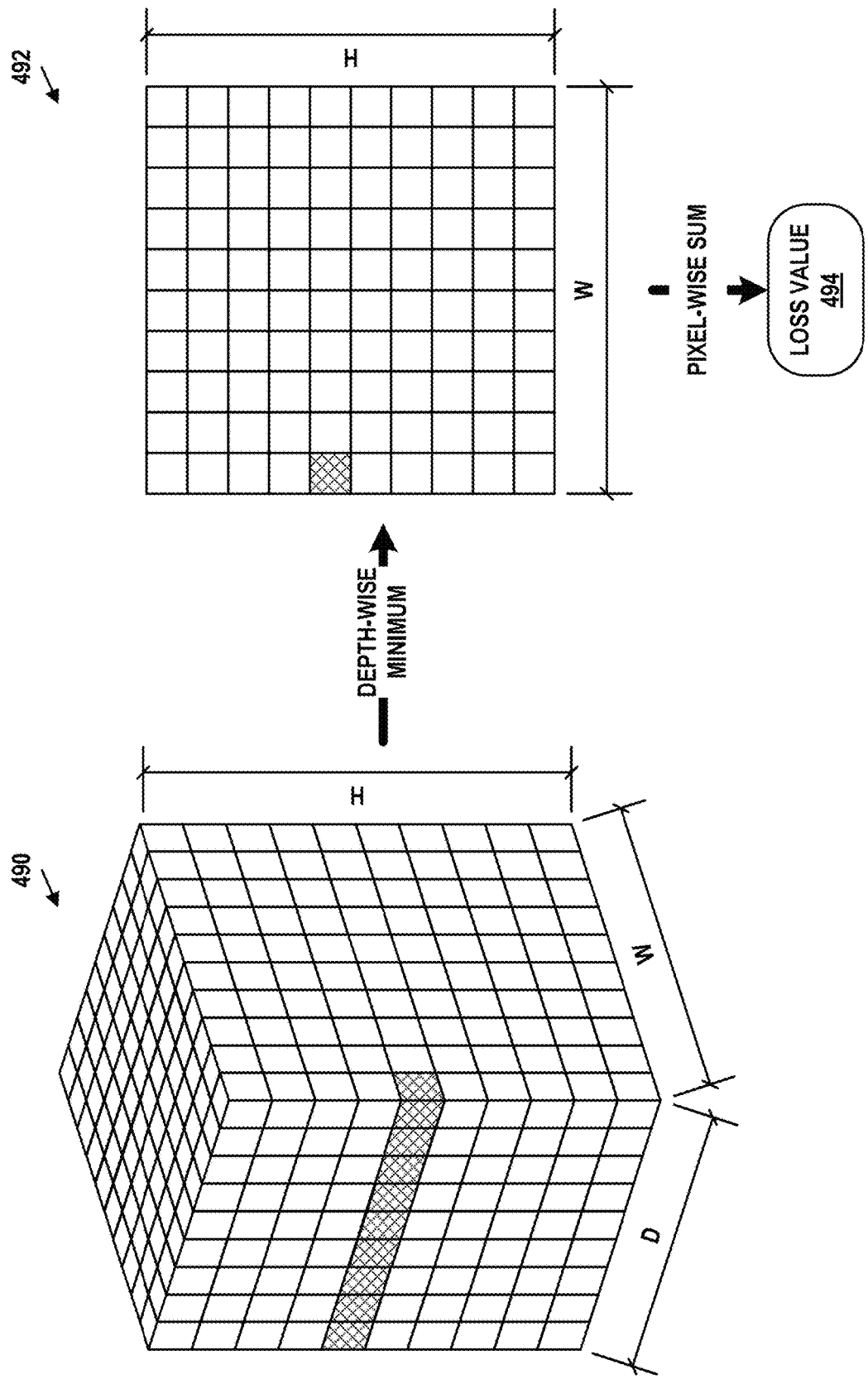

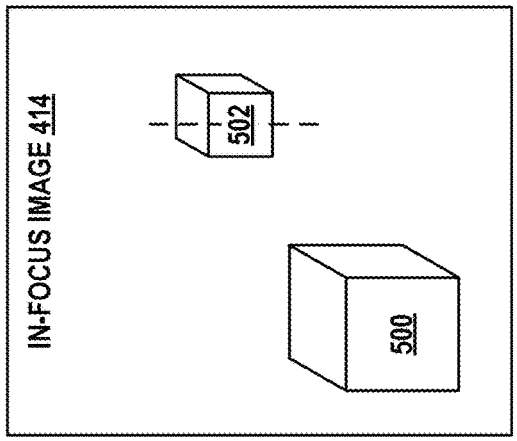
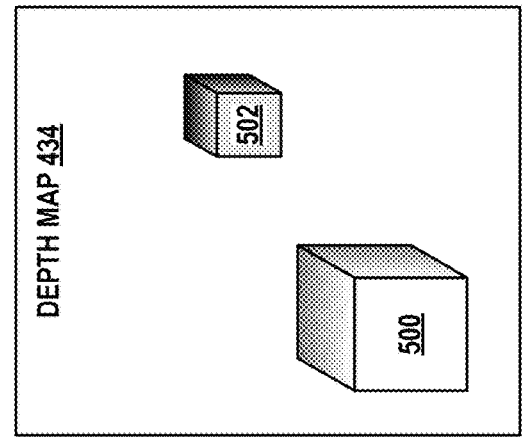
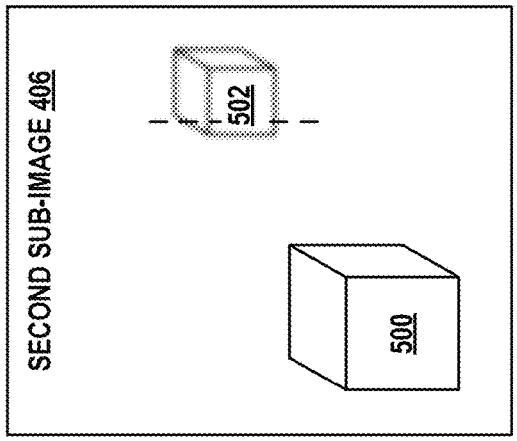
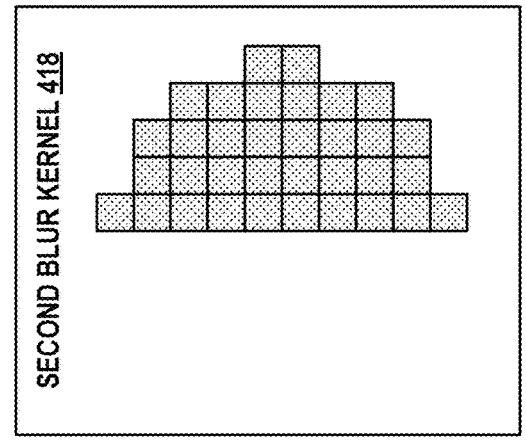
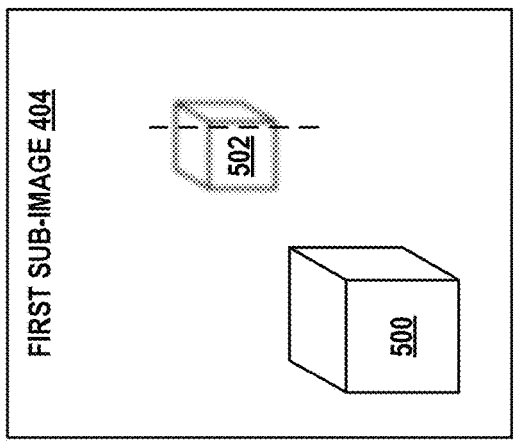
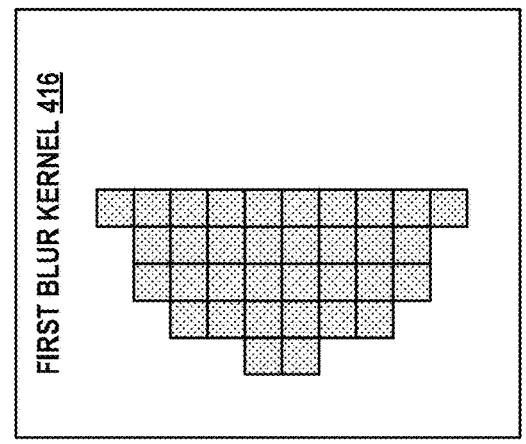
Figure 5

DEFOCUS BLUR REMOVAL AND DEPTH ESTIMATION USING DUAL-PIXEL IMAGE DATA

CROSS-REFERENCE TO RELATED APPLICATIONS

The present application is a National Stage Application under 35 U.S.C. § 371 and claims priority to International Patent Application No. PCT/US2020/060517, filed Nov. 13, 2020, and titled "Defocus Blur Removal and Depth Estimation Using Dual-Pixel Image Data," which is incorporated herein by reference in its entirety.

BACKGROUND

A portion of an image may be blurred due to a corresponding object being positioned outside of a depth of field of a camera device capturing the image. The extent of blurring may depend on the position of the corresponding object relative to the depth of field, with the amount of blurring increasing as the corresponding object moves farther away from the depth of field in either a direction towards the camera or a direction away from the camera. In some cases, image blurring is undesirable, and may be adjusted or corrected using various image processing techniques, models, and/or algorithms.

SUMMARY

Dual-pixel image data may include defocus cues that may be used to recover an in-focus image and/or a depth map corresponding to the dual-pixel image data. Specifically, the dual-pixel image data may include a first sub-image and a second sub-image. The in-focus image, when convolved with a first blur kernel, may generate the first sub-image and/or an approximation thereof, and, when convolved with a second blur kernel, may generate the second sub-image and/or an approximation thereof. A loss function may be formulated based on these relationships between the in-focus image, the blur kernels, and the dual-pixel image data. The loss function may be used to train a mathematical model configured to generate the in-focus image and, in some cases, one or more mathematical models configured to generate the first and second blur kernels. The blur kernels may be applied to the in-focus image and/or the dual-pixel image data at a plurality of size scales, thereby generating a cost volume. The cost volume may be used to select, for each respective pixel of the in-focus image, a corresponding size scale at which to apply the first and second blur kernels, thereby indicating a depth associated with the respective pixel.

In a first example embodiment, a method may include obtaining dual-pixel image data that includes a first sub-image and a second sub-image. The method may also include determining (i) an in-focus image, (ii) a first blur kernel corresponding to the first sub-image, and (iii) a second blur kernel corresponding to the second sub-image. The method may additionally include determining a loss value using a loss function that includes one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel. The method may further include, based on the loss value and the loss function, updating one or more of: (i) the in-focus image, (ii) the first blur kernel, or (iii) the second blur kernel. The method may yet further include generating image data based on one or more of: (i) the in-focus image as updated, (ii) the first blur kernel as updated, or (iii) the second blur kernel as updated.

In a second example embodiment, a system may include a processor and a non-transitory computer-readable medium having stored thereon instructions that, when executed by the processor, cause the processor to perform operations. The operations may include obtaining dual-pixel image data that includes a first sub-image and a second sub-image. The operations may also include determining (i) an in-focus image, (ii) a first blur kernel corresponding to the first sub-image, and (iii) a second blur kernel corresponding to the second sub-image. The operations may additionally include determining a loss value using a loss function that includes one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel. The operations may further include, based on the loss value and the loss function, updating one or more of: (i) the in-focus image, (ii) the first blur kernel, or (iii) the second blur kernel. The operations may yet further include generating image data based on one or more of: (i) the in-focus image as updated, (ii) the first blur kernel as updated, or (iii) the second blur kernel as updated.

In a third example embodiment, a non-transitory computer-readable medium may have stored thereon instructions that, when executed by a computing device, cause the computing device to perform operations. The operations may include obtaining dual-pixel image data that includes a first sub-image and a second sub-image. The operations may also include determining (i) an in-focus image, (ii) a first blur kernel corresponding to the first sub-image, and (iii) a second blur kernel corresponding to the second sub-image. The operations may additionally include determining a loss value using a loss function that includes one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel. The operations may further include, based on the loss value and the loss function, updating one or more of: (i) the in-focus image, (ii) the first blur kernel, or (iii) the second blur kernel. The operations may yet further include generating image data based on one or more of: (i) the in-focus image as updated, (ii) the first blur kernel as updated, or (iii) the second blur kernel as updated.

In a fourth example embodiment, a system may include means for obtaining dual-pixel image data that includes a first sub-image and a second sub-image. The system may also include means for determining (i) an in-focus image, (ii) a first blur kernel corresponding to the first sub-image, and (iii) a second blur kernel corresponding to the second sub-image. The system may additionally include means for determining a loss value using a loss function that includes one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel. The system may further include means for, based on the loss value and the loss function, updating one or more of: (i) the in-focus image, (ii) the first blur kernel, or (iii) the second blur kernel. The system may yet further include means for generating image data based on one or more of: (i) the in-focus image as updated, (ii) the first blur kernel as updated, or (iii) the second blur kernel as updated.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 illustrates a dual-pixel image sensor, in accordance with examples described herein.

FIG. 4D illustrates a cost volume, in accordance with examples described herein.

FIG. 5 illustrates dual-pixel images, blur kernels, and a depth map, in accordance with examples described herein.

DETAILED DESCRIPTION

Figure 1:
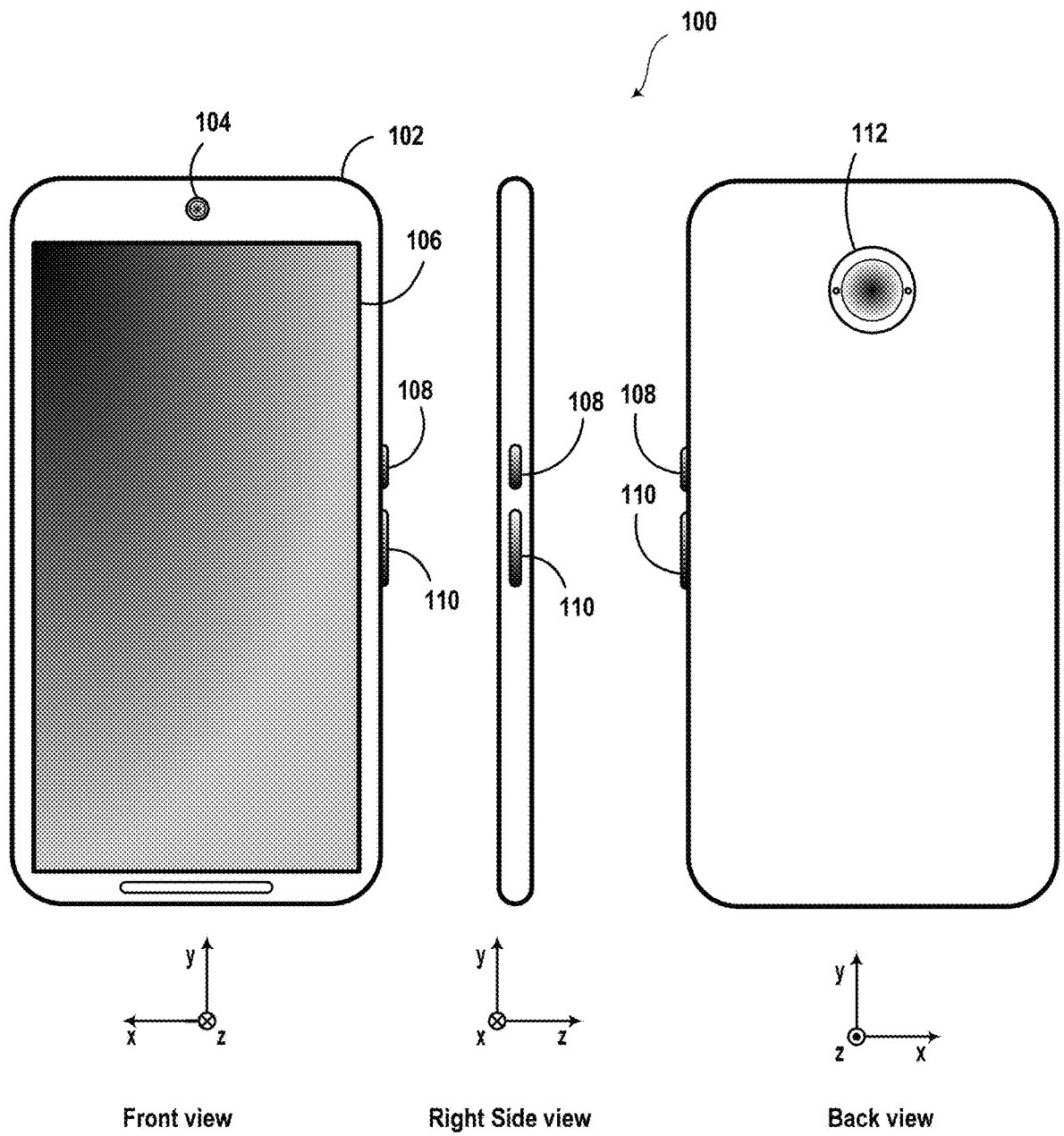
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A dual-pixel image sensor may include at least some pixels (i.e., dual pixels) that are divided into two photosites, each including a corresponding independently-readable photodiode. Thus, the dual-pixel image sensor may be configured to generate dual-pixel image data that includes a first sub-image generated using a first photosite of each dual pixel (e.g., a left dual-pixel sub-image generated based on the left photosite of each dual pixel) and a second sub-image generated using a second photosite of each dual pixel (e.g., a right dual-pixel sub-image generated based on the right photosite of each dual pixel). While the dual-pixel image data includes two sub-images, the dual-pixel image data is nevertheless monoscopic in that, unlike stereoscopic image data, it is generated using a single aperture.

When light reflected from a portion of a scene is focused on a corresponding portion of the dual-pixel image sensor, each photosite of a corresponding dual pixel may generate a similar and/or substantially identical signal. When light reflected from the portion of a scene is out of focus with the corresponding portion of the dual-pixel image sensor, each photosite of the corresponding dual pixel may generate a different signal. Thus, dual-pixel image data generated by the dual-pixel image sensor may contain information indicative of an extent of defocus associated with each dual pixel, and may thus be used to adjust the extent of apparent blurring associated with the dual-pixel image data.

Specifically, the relationship between the first sub-image, the second sub-image, an in-focus image (e.g., an image that appears focused along all portions thereof), a first blur kernel associated with the first sub-image, and a second blur kernel associated with the second sub-image may be used to formulate an optimization function (i.e., loss function). For example, the in-focus image, the first blur kernel, and/or the second blur kernel may each be represented by a corresponding mathematical model. The optimization function may be used to train these mathematical models so as to reduce (e.g., below a threshold value) and/or minimize a loss value generated using the optimization function. The optimization function may include an equivalence loss term, a data loss term, and/or one or more prior loss terms, each of which may express a relationship among the first sub-image, the second sub-image, the in-focus image, the first blur kernel, and/or the second blur kernel.

The equivalence loss term and/or the data loss term may be derived based on a relationship between the in-focus image, the dual-pixel sub-images, and the corresponding blur kernels. Specifically, the first sub-image may be expressed as a convolution of the in-focus image and the first blur kernel. Similarly, the second sub-image may be expressed as a convolution of the in-focus image and the second blur kernel.

Thus, the equivalence term may be configured to determine a difference between (i) a convolution of the first sub-image with the second blur kernel and (ii) a convolution of the second sub-image with the first blur kernel. The equivalence loss term may thus incentivize the optimization to generate blur kernels that increase and/or maximize an extent of symmetry between convolutions of the blur kernels and the dual-pixel sub-images. The data loss term may be configured to determine a sum of (i) a difference between the first sub-image and a convolution of the in-focus image with the first blur kernel and (ii) a difference between the second sub-image and a convolution of the in-focus image with the second blur kernel. The data loss term may thus incentivize the optimization to generate an in-focus image and/or blur kernels that reduce and/or minimize the amount of information lost relative to the corresponding dual-pixel sub-image as a result of the convolution.

Each of the first blur kernel and the second blur kernel may be configured to deblur parts of the scene associated with a particular depth. Thus, in order to deblur features at different depths, each of the first blur kernel and the second blur kernel may be scaled to a plurality of size scales, with each size scale corresponding to a particular depth relative to the dual-pixel camera device. The equivalence loss term and/or the data loss term may be computed at each size scale, thereby generating corresponding equivalence loss images and/or data loss images that, when stacked, form an equivalence loss cost volume and/or data loss cost volume.

The cost volume may be reduced by selecting, for each respective pixel represented by a cross-section of the cost volume, a corresponding pixel value, from a plurality of spatially corresponding pixels along a depth of the cost volume, of a pixel that has been most effectively deblurred. In some cases, the cross-section of the cost volume may have a same resolution as the in-focus image. Thus, the reduction of the cost volume may indicate, for each respective pixel of the in-focus image, a corresponding size scale associated with the respective pixel. Since each size scale corresponds to a particular object depth, reduction of the cost volume may also generate a depth map associated with the in-focus image. Accordingly, the optimization may simultaneously (i) generate the in-focus image, (ii) generate a corresponding depth map, (iii) select a kernel scaling at which to apply the first and/or second blur kernels, and, in some cases (iv) generate the first and second blur kernels.

The corresponding mathematical models that generate the in-focus image, the first blur kernel, and/or the second blur kernel may be trained on a per-image basis, rather than being trained to operate with respect to a plurality of different dual-pixel images. Accordingly, training of the mathematical models is self-supervised in that the optimization function and the dual-pixel image data are sufficient to perform the training, and the training is not dependent on ground-truth data. In fact, the trained mathematical models may be used to generate ground-truth data that can be used to train other, different machine learning models.

In some cases, since blur kernels are scene independent (depending instead on the shape of the aperture of the camera device), the first and second blur kernels may be calibrated for each of a plurality of different camera devices. When the first and second blur kernels are calibrated, the first and second blur kernels might not be generated de novo by the corresponding models. Accordingly, based on the specific camera device (e.g., specific model thereof) used to generate a given dual-pixel image, corresponding calibrated first and second blur kernels may be selected and used to train the mathematical model configured to generate the in-focus image, thereby reducing a complexity of the optimization. For example, the calibrated blur kernels may be treated as fixed by the optimization function, or may be refined during training.

The resulting in-focus image, depth map, and/or first and second blur kernels may be used to perform various adjustments to the dual-pixel image data. For example, the extent of blurring associated with various portions of the dual-pixel image data may be adjusted to target levels (e.g., by increasing and/or decreasing blurring in various regions). Further, since the depth map corresponds to the dual-pixel image data, the dual-pixel image data may be used for various augmented reality (AR) applications, such as insertion of simulated objects into the scene represented by the dual-pixel image data in a depth-aware manner, among other possibilities.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, or a wearable computing device, among other possibilities. Computing device 100 may include various elements, such as body 102, display 106, and buttons 108 and 110. Computing device 100 may further include one or more cameras, such as front-facing camera 104 and rear-facing camera 112, one or more of which may be configured to generate dual-pixel image data.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of any aspect of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
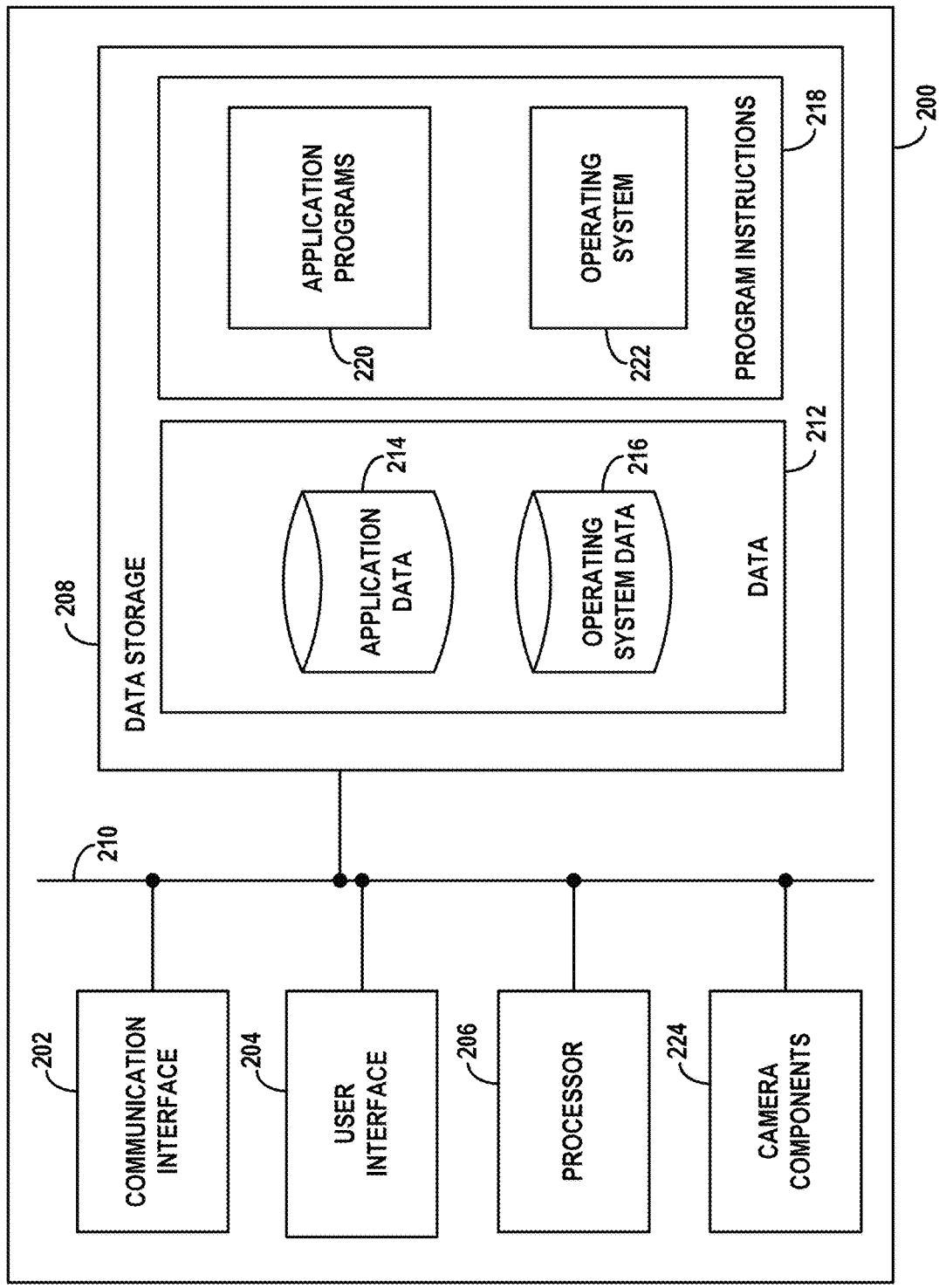
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Dual-Pixel Image Sensor

FIG. 3 illustrates dual-pixel image sensor 300 that is configured to generate dual-pixel image data. Specifically, dual-pixel image sensor 300 includes a plurality of pixels arranged in a grid that includes columns 302, 304, 306, and 308 through 310 (i.e., columns 302-310) and rows 312, 314, 316, and 318 through 320 (i.e., rows 312-320). Each pixel is shown divided into a first (left) photosite, indicated with a corresponding hatched region, and a second (right) photosite, indicated with a corresponding white-filled region. Thus, the right half of the pixel located at column 302, row 312 is labeled "R" to indicate the right photosite, and the left half of the pixel is labeled "L" to indicate the left photosite. Although the photosites of each pixel are shown dividing each pixel into two equal vertical halves, the photosites may alternatively divide each pixel in other ways. For example, each pixel may be divided into a top photosite and a bottom photosite. The areas of the photosites might not be equal.

Each photosite of a given pixel may include a corresponding photodiode, the output signal of which may be read independently of other photodiodes. Additionally, each pixel of dual-pixel image sensor 300 may be associated with a corresponding color filter (e.g., red, green, or blue). A demosaicing algorithm may be applied to the output of dual-pixel image sensor 300 to generate a color image. In some cases, fewer than all of the pixels of dual-pixel image sensor 300 may be divided into multiple photosites. For example, each pixel associated with a green color filter may be divided into two independent photosites, while each pixel associated with a red or blue color filter may include a single photosite. In some cases dual-pixel image sensor 300 may be used to implement front-facing camera 104 and/or rear-facing camera 112, and may form part of camera components 224.

Dual-pixel image sensor 300 may be configured to generate dual-pixel image data. The dual pixel image data may include a first sub-image generated by the first photosites (e.g., left photosites only) and a second sub-image generated by the second photosites (e.g., right photosites only). When an object or portion thereof being imaged is in-focus, the respective signal generated by each photosite of a given pixel may be substantially the same (e.g., the two signals may be within a threshold of one another). When the object or portion thereof being imaged is out-of-focus, the respective signal generated by the first photosite of a given pixel may differ from the respective signal generated by the second photosite of the given pixel, and the amount of difference may be proportional to an extent of defocus. Thus, the dual-pixel image data generated by dual-pixel image sensor 300 may provide defocus cues that may be used to adjust the level of focus associated with various portions of the dual-pixel image data. The signals generated by each photosite of a given pixel may be combined into a single output signal, thereby generating conventional (e.g., RGB) image data.

IV. Example System for Generation of In-Focus Image and Corresponding Depth Map

Figure 4A:
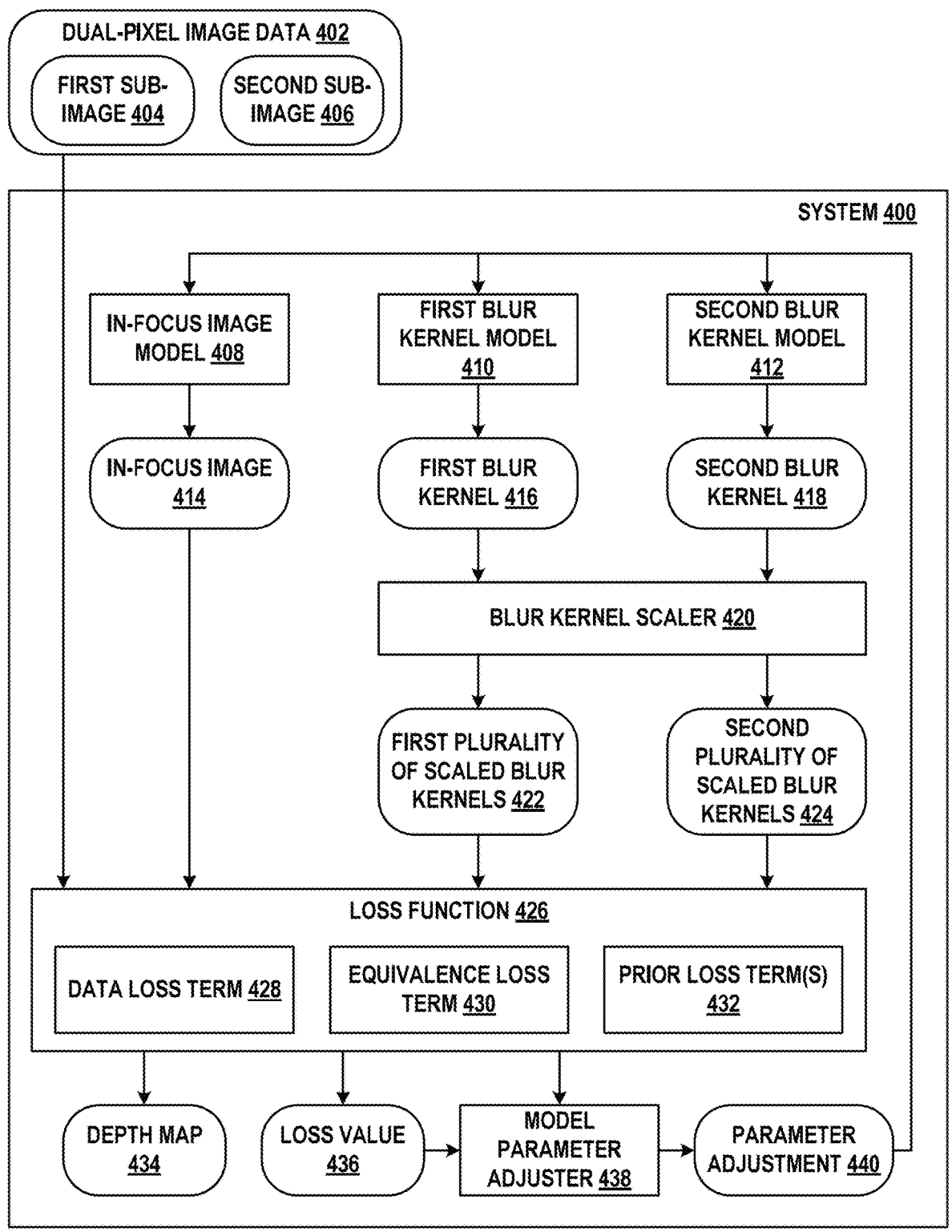
FIGS. 4A, 4B, and 4C illustrate aspects of a system, in accordance with examples described herein.

FIG. 4A illustrates system 400 configured to determine an extent of defocus and a depth map associated with and based on dual-pixel image data. Specifically, system 400 includes in-focus image model 408, first blur kernel model 410, second blur kernel model 412, blur kernel scaler 420, loss function 426, and model parameter adjuster 438. Loss function 426 may include data loss term 428, equivalence loss term 430, and prior loss term(s) 432. Each of the components of system 400 may represent software instructions (e.g., configured to be executed by processor 206), hardware components (e.g., purpose-built circuitry), or a combination thereof.

Dual-pixel image data 402 may be generated, for example, by dual-pixel image sensor 300. System 400 may be configured to receive dual-pixel image data 402 as input. Dual-pixel image data 402 may include first sub-image 404 generated using a first subset of dual-pixel photosites (e.g., left photosites) of dual-pixel image sensor 300 and second sub-image 406 generated using a second subset of dual-pixel photosites (e.g., right photosites) of dual-pixel image sensor 300. Depending on the context, dual-pixel image data 402 may be used herein to refer to (i) first sub-image 404 and second sub-image 406 or (ii) image data resulting from combination of first sub-image 404 and second sub-image 406.

In-focus image model 408 may be configured to generate in-focus image 414, which may represent a modified version of dual-pixel image data 402 with at least a portion thereof adjusted to improve the extent of focus. When in-focus image model 408 is trained to at least a threshold level of accuracy (e.g., as quantified by way of loss function 426), in-focus image 414 may represent a modified version of dual-pixel image data 402 with most portions thereof brought into focus (i.e., exhibiting less than a threshold extent of defocus blurring). For example, in-focus image 414 may represent a version of dual-pixel image data 402 with substantially all portions thereof being in-focus. In-focus image model 408 may include a corresponding mathematical model configured to generate, for each pixel of in-focus image 414, a corresponding pixel value. One or more parameters of this mathematical model may be adjustable during training (e.g., via model parameter adjuster 438) to improve an accuracy of in-focus image 414.

First blur kernel model 410 may be configured to generate first (convolutional) blur kernel 416, and second blur kernel model 412 may be configured to generate second (convolutional) blur kernel 418. In some cases, a single blur kernel model may be configured to generate a single blur kernel image that represents both first blur kernel 416 (e.g., on a first half of the blur kernel image) and second blur kernel 418 (e.g., on a second half of the blur kernel image). A shape of each of first blur kernel 416 and second blur kernel 418 may be based on a shape of an aperture of a specific dual-pixel camera device used to generate dual-pixel image data 402, and may thus be scene-independent. Accordingly, first blur kernel model 410 and second blur kernel model 412 may vary depending on whether respective blur kernels have been predetermined/calibrated for the specific dual-pixel camera device.

In some implementations, first blur kernel model 410 may include a corresponding mathematical model configured to generate, for each pixel of first blur kernel 416, a corresponding pixel value. Similarly, second blur kernel model 412 may include a corresponding mathematical model configured to generate, for each pixel of second blur kernel 418, a corresponding pixel value. One or more parameters of each of these mathematical models may be adjustable during training to improve an accuracy of first blur kernel 416 and/or second blur kernel 418 (e.g., as quantified by way of loss function 426). Such implementations of first blur kernel model 410 and/or second blur kernel model 412 may be used, for example, when the respective blur kernels have not been predetermined/calibrated for the specific dual-pixel camera device, and are thus generated based on loss function 426.

In other implementations, first blur kernel model 410 may include one or more representations of first blur kernel 416 that have been predetermined/calibrated for corresponding one or more dual-pixel camera devices. Thus, first blur kernel model 410 may be configured to select one of these representations of first blur kernel 416 based on the specific dual-pixel camera device used to generate dual-pixel image data 402. Similarly, second blur kernel model 412 may include one or more representations of second blur kernel 418 that have been predetermined/calibrated for corresponding one or more dual-pixel camera devices. Thus, second blur kernel model 412 may be configured to select one of these representations of second blur kernel 418 based on the specific dual-pixel camera device used to generate dual-pixel image data 402. In some cases, first blur kernel model 410 and/or second blur kernel model 412 may also be configured to refine the selected representations of first blur kernel 416 and/or second blur kernel 418, respectively, as part of the training process, and may thus include the corresponding mathematical models in addition to the representations of the predetermined/calibrated kernels.

Each of first blur kernel 416 and second blur kernel 418 may represent a corresponding point spread function (PSF) associated with optical components of the dual-pixel camera device used to generate dual-pixel image data 402. Specifically, first blur kernel 416 may be associated with first sub-image 404 in that first blur kernel 416 may represent the PSF associated with the first (e.g., left) photosites of the dual-pixel image sensor, while second blur kernel 418 may be associated with second sub-image 406 in that second blur kernel 418 may represent the PSF associated with the second (e.g., right) photosites of the dual-pixel image sensor.

A size of each of first blur kernel 416 and second blur kernel 418 may be based on a depth of the object or portion thereof being imaged. Thus, when dual-pixel image data 402 contains representations of objects or portions thereof positioned at different depths relative to the dual-pixel camera device, each portion of dual-pixel image data 402 may be associated with first blur kernel 416 and second blur kernel 418 that have been scaled to a corresponding size associated with the corresponding depth.

Specifically, the relationships between in-focus image 414, dual-pixel image data 402, and first blur kernel 416 may be represented by $I_1(x)=I(x)*K_{r(x)}^1$, where $I_1(x)$ represents a particular pixel of first sub-image 404, $I(x)$ represents a corresponding pixel of in-focus image 414, * represents the convolution operation, and $K_{r(x)}^1$ represents first blur kernel 416 scaled to a radius associated with a corresponding depth represented by the corresponding pixel of in-focus image 414. Similarly, the relationships between in-focus image 414, dual-pixel image data 402, and second blur kernel 418 may be represented by $I_2(x)=I(x)*K_{r(x)}^2$, where $I_2(x)$ represents a particular pixel of second sub-image 406, $I(x)$ represents a corresponding pixel of in-focus image 414, * represents the convolution operation, and $K_{r(x)}^2$ represents second blur kernel 418 scaled to a radius associated with a corresponding depth represented by the corresponding pixel of in-focus image 414. In some cases, these equations may additionally model noise by including, for example, a Gaussian noise term.

Accordingly, system 400 includes blur kernel scaler 420 configured to generate (i) first plurality of scaled blur kernels 422 based on first blur kernel 416 and (ii) second plurality of scaled blur kernels 424 based on second blur kernel 418. First plurality of scaled blur kernels 422 may include first blur kernel 416 represented at a plurality of different size scales (e.g., 1.0×, 0.8×, 0.6×, 0.4×, 0.2×, 0.001×, −0.2×, −0.4×, −0.6×, −0.8×, and −1.0×). Similarly, second plurality of scaled blur kernels 424 may include second blur kernel 418 represented at the plurality of different size scales.

System 400 may be configured to apply first plurality of scaled blur kernels 422 and second plurality of scaled blur kernels 424 to dual-pixel image data 402 and/or in-focus image 414 in order to determine, for each pixel of dual-pixel image data 402, a corresponding size scale. Specifically, dual-pixel image data 402, in-focus image 414, first plurality of scaled blur kernels 422, and second plurality of scaled blur kernels 424 may be processed by loss function 426 to generate depth map 434 and loss value 436. Loss function 426 may include data loss term 428, which is illustrated in more detail in FIG. 4B, equivalence loss term 430, which is illustrated in more detail in FIG. 4C, and prior loss term(s) 432. The corresponding size scale for each pixel of dual-pixel image data 402 may be selected based on outputs of one or more terms of loss function 426. Since each size scale is associated with a corresponding depth value, selection of the corresponding size scale for each pixel of dual-pixel image data 402 may also generate depth map 434 that represents the depth of each pixel of dual-pixel image data 402.

Model parameter adjuster 438 may be configured to generate, based on loss value 436 and loss function 426, parameter adjustment 440. Specifically, parameter adjustment 440 may represent one or more changes to one or more parameters of in-focus image model 408, first blur kernel model 410, and/or second blur kernel model 412. Parameter adjustment 440 may be selected so as to decrease loss value 436 resulting from a subsequent processing iteration of system 400. For example, model parameter adjuster 438 may be configured to select parameter adjustment 440 based on a gradient of loss function 426 (i) at the point corresponding to loss value 436 and (ii) with respect to parameters of in-focus image model 408, first blur kernel model 410, and/or second blur kernel model 412.

Thus, model parameter adjuster 438 may generate parameter adjustments 440 that result in successively lower loss values 436. System 400 may be configured to train a different instance of in-focus image model 408, first blur kernel model 410, and/or second blur kernel model 412 with respect to each instance of dual-pixel image data 402. Thus, in-focus image model 408, first blur kernel model 410, and/or second blur kernel model 412 may be independently improved, refined, and/or optimized with respect to each instance of dual-pixel image data 402, rather than being improved, refined, and/or optimized for a training data set that includes a plurality of different instances of dual-pixel image data 402.

Once training of in-focus image model 408, first blur kernel model 410, and/or second blur kernel model 412 is completed, in-focus image 414, first blur kernel 416, and/or second blur kernel 418 may be used to generate and/or display image data that modifies one or more aspects of dual-pixel image data 402. In one example, the generated image data may include dual-pixel image data 402 with the extent of blurring of portions thereof adjusted. In some cases, blurring in some portions of dual-pixel image data 402 may be reduced, while blurring in other portions of dual-pixel image data 402 may be increased. In other cases, all portions of dual-pixel image data 402 may be brought into focus, and the generated image data may thus be equivalent to in-focus image 414. In a further example, representations of objects may be added to dual-pixel image data 402 in a depth-aware manner.

V. Example Data Loss Term Computation

Figure 4B:
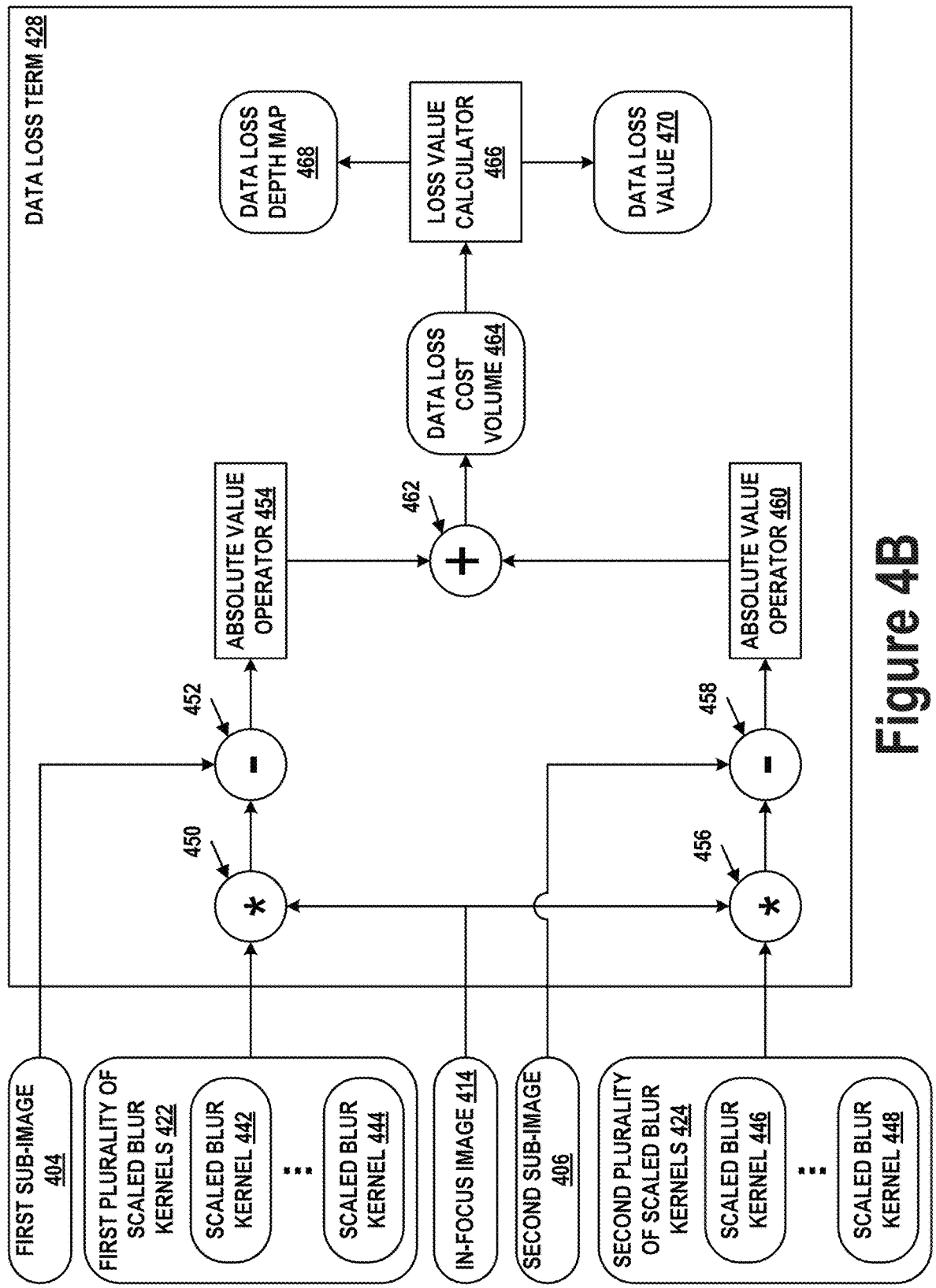

FIG. 4B illustrates an example implementation of data loss term 428 of loss function 426. First plurality of scaled blur kernels 422 may include scaled blur kernel 442 through scaled blur kernel 444 (i.e., scaled blur kernels 442-444) representing first blur kernel 416 at a plurality of different size scales, and second plurality of scaled blur kernels 424 may include scaled blur kernel 446 through scaled blur kernel 448 (i.e., scaled blur kernels 446-448) representing second blur kernel 418 at the plurality of different size scales.

Data loss term 428 may be configured to compute, for each respective size scale of the plurality of size scales, a corresponding sum image based on sum 462 of (i) an absolute value (determined by absolute value operator 454) of difference 452 between first sub-image 404 and convolution 450 of in-focus image 414 with a corresponding scaled blur kernel of scaled blur kernels 442-444 and (ii) an absolute value (determined by absolute value operator 460) of difference 458 between second sub-image 406 and convolution 456 of in-focus image 414 with a corresponding scaled blur kernel of scaled blur kernels 446-448. Thus, data loss term 428 may implement the function $|I_1-I*K_r^1|+|I_2-I*K_r^2|$, where I represents in-focus image 414, $I_1$ represents first sub-image 404, $I_2$ represents second sub-image 406, $K_r^1$ represents a scaled blur kernel of scaled blur kernels 442-444 associated with the respective size scale, and $K_r^2$ represents a scaled blur kernel of scaled blur kernels 446-448 associated with the respective size scale.

Data loss cost volume 464 may be generated by stacking the sum image corresponding to each respective size scale of the plurality of size scales. Thus, data loss cost volume 464 may have a width W corresponding to a width of the sum images (which may have a same resolution as in-focus image 414), a height H corresponding to a height of the sum images, and a depth D corresponding to the plurality of size scales. Loss value calculator 466 may be configured to determine data loss value 470 and data loss depth map 468 based on data loss cost volume 480. Specifically, loss value calculator 466 may be configured to select, for each respective pixel of W pixels by H pixels of a cross-section of data loss cost volume 464, a smallest pixel value from a plurality of values of pixels that spatially correspond to the respective pixel along the depth of cost volume 464. Further, data loss value 470 may be determined by summing the values selected for the respective pixels.

Each selected pixel value may be associated with a corresponding size scale for the respective pixel. Thus, loss value calculator 466 may be configured to select, for each respective pixel of W pixels by H pixels of the cross-section of data loss cost volume 464, a corresponding size scale of a blur kernel that most effectively deblurs the respective pixel. Further, since each size scale may correspond to a particular depth relative to the dual-pixel camera device used to capture dual-pixel image data 402, selection of a corresponding size scale for each respective pixel may be indicative of a depth value associated with the respective pixel. Thus, data loss value 470 and data loss depth map 468 may be determined jointly by way of the described process.

VI. Example Equivalence Loss Term Computation

Figure 4C:
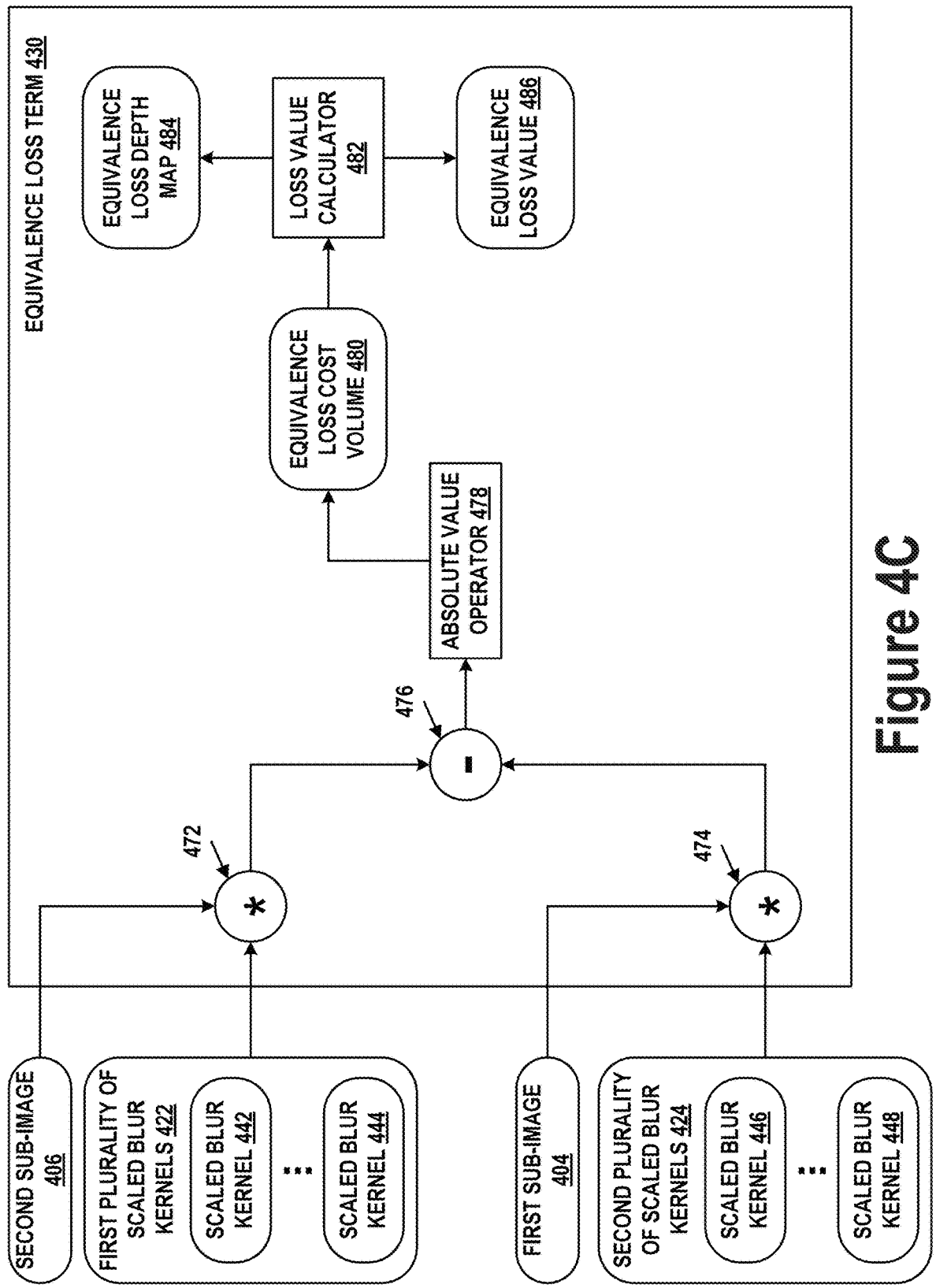

FIG. 4C illustrates an example implementation of equivalence loss term 430 of loss function 426. Equivalence loss term 430 may be configured to compute, for each respective size scale of the plurality of size scales, a corresponding difference image based on an absolute value (determined by absolute value operator 478) of difference 476 of (i) convolution 472 of second sub-image 406 with a corresponding scaled blur kernel of scaled blur kernels 442-444 and (ii) convolution 474 of first sub-image 404 with a corresponding scaled blur kernel of scaled blur kernels 446-448. Thus, equivalence loss term 430 may implement the function $|I_1*K_r^2-I_2*K_r^1|$, where $I_1$ represents first sub-image 404, $I_2$ represents second sub-image 406, $K_r^1$ represents a scaled blur kernel of scaled blur kernels 442-444 associated with the respective size scale, and $K_r^2$ represents a scaled blur kernel of scaled blur kernels 446-448 associated with the respective size scale. Specifically, since $I_1=I*K_r^1$ and $I_2=I*K_r^2$, then $I_1*K_r^2=I*K_r^1*K_r^2=I*K_r^2*K_r^1=I_2*K_r^1$ (due to commutative property of convolution), and thus $I_1*K_r^2=I_2*K_r^1$, or, equivalently, $I_1*K_r^2-I_2*K_r^1=0$.

Equivalence loss cost volume 480 may be generated by stacking the difference image corresponding to each respective size scale of the plurality of size scales. Thus, equivalence loss cost volume 480 may have a width W corresponding to a width of the difference images, a height H corresponding to a height of the difference images, and a depth D corresponding to the plurality of size scales. Loss value calculator 482 (which may be the same as or similar to loss value calculator 466) may be configured to determine equivalence loss value 486 and equivalence loss depth map 484 based on equivalence loss cost volume 480. Specifically, loss value calculator 482 may be configured to select, for each respective pixel of W pixels by H pixels of a cross-section of equivalence loss cost volume 480, a smallest pixel value from a plurality of values of pixels that spatially correspond to the respective pixel along the depth of cost volume 480. Further, equivalence loss value 486 may be determined by summing the values selected for the respective pixels.

Since each selected pixel value may be associated with a corresponding size scale for the respective pixel, loss value calculator 482 may thus be configured to select, for each respective pixel of W pixels by H pixels of the cross-section of equivalence loss cost volume 480, a corresponding size scale of a blur kernel that most effectively deblurs the respective pixel. Further, since each size scale may correspond to a particular depth relative to the dual-pixel camera device used to capture dual-pixel image data 402, selection of a corresponding size scale for each respective pixel may be indicative of a depth value associated with the respective pixel. Thus, equivalence loss value 486 and equivalence loss depth map 484 may be determined jointly by way of the described process.

VII. Example Cost Volume Reduction

FIG. 4D provides a visual illustration of a cost volume and a reduction thereof (e.g., by loss value calculator 466 and/or 482) to a loss value. Specifically, cost volume 490 may represent, for example, data loss cost volume 464 and/or equivalence loss cost volume 480. The depth dimension, which includes D pixels, may correspond to and be based on the number of size scales to which each of first blur kernel 416 and second blur kernel 418 are scaled. The width and height dimensions, which include W pixels and H pixels, respectively, may correspond to and be based on a number of pixels present in the sum images (in the case of data loss term 428) or difference images (in the case of equivalence loss term 430) used to generate cost volume 490.

Cost volume 490 may be reduced along the depth dimension D to generate cost image 492. Specifically, each pixel position along the W pixel by H pixel cross section of cost volume 490 may be associated with D spatially corresponding pixels along the depth dimension of cost volume 490. Specifically, FIG. 4D illustrates cost volume 490 having a cross section that includes 100 pixel positions, each of which is associated with 9 spatially corresponding pixels along the depth dimension, totaling 900 pixels. Cost volume 490 may be reduced to cost image 492 by selecting, for each of the H×W (e.g., 100) pixel positions of the cross section of cost volume 490, a minimum pixel value along the depth dimension. For example, a lowest-valued pixel may be selected from among the pixels indicated with the hatched pattern as part of cost volume 490, resulting in a corresponding pixel value for cost image 492.

Cost image 492 may thus represent the lowest-valued pixel for each pixel position along the H×W cross section of cost volume 490. Since each lowest-valued pixel is also associated with a corresponding size scale, which, in turn, is associated with a corresponding depth value, cost image 492 may also represent and be used to generate a depth map (e.g., data loss depth map 468 and/or equivalence loss depth map 484). In some cases, the depth map may represent the relative depth of each pixel therein using unitless values. When a particular blur kernel associated with a given size scale is mapped to a corresponding physical depth (e.g., based on optical properties of the dual-pixel camera device), the depth map may additionally or alternatively represent the depth of each pixel using values that correspond to physical units (e.g., meters). Cost image 492 may be further reduced to cost value 494 (representing, e.g., data loss value 470 and/or equivalence loss value 486) by taking a sum of all the pixel values of cost image 492.

Turning back to FIG. 4A, loss value 436 may represent, for example, a sum of data loss value 470, equivalence loss value 486, and/or a prior loss value generated by prior loss term(s) 432. Depth map 434 may represent, for example, data loss depth map 468, equivalence loss depth map 484, or a combination thereof. For example, depth map 434 may represent a pixel-wise average of data loss depth map 468 and equivalence loss depth map 484.

Prior loss term(s) 432 may include one or more equations that further define aspects of the optimization problem solved by system 400 to speed up convergence to a solution and/or improve an accuracy of the solution. In one example, prior loss term(s) 432 may include a total variation denoising loss term configured to determine a total variation of (i) in-focus image 414, (ii) first blur kernel 416, and/or (iii) second blur kernel 418. For example, the total variation denoising term may be configured to compute a sum of a total variation of each of in-focus image 414, first blur kernel 416, and second blur kernel 418. A total variation value of an image signal y may be expressed, for example, according to $\Sigma_{i,j}|y_{i+1,j}-y_{i,j}|+|y_{i,j+1}-y_{i,j}|$, where the image signal y may represent in-focus image 414, first blur kernel 416, and/or second blur kernel 418, and where i and j represent pixel coordinates.

In a second example, prior loss term(s) 432 may include a deep convolutional prior loss term configured to determine a result of generation and/or processing of (i) in-focus image 414, (ii) first blur kernel 416, and/or (iii) second blur kernel 418 by one or more artificial neural networks. For example, the prior loss term may be implicitly included by parameterizing (i) in-focus image 414, (ii) first blur kernel 416, and/or (iii) second blur kernel 418 as outputs of one or more artificial neural networks, for example, as described in a paper titled "Deep Image Prior" authored by Dmitry Ulyanov et al. (the deep convolutional prior may thus be viewed as a deep image prior), and/or as described in a paper titled "Neural Blind Deconvolution Using Deep Priors" authored by Dongwei Ren et al. (the deep convolutional prior may thus be viewed as a blind deconvolution prior). Other priors based on processing by neural networks are possible.

In a third example, prior loss term(s) 432 may include a depth loss term configured to compare (i) one or more features of depth map 434 to (ii) one or more corresponding features of in-focus image 414. For example, the depth loss term may quantify a spatial alignment of representations of a given set of features, such as edges, in depth map 434 and in-focus image 414. Thus, system 400 may be trained to generate in-focus image 414 and depth map 434 that are coherent with one another.

VIII. Example Images, Kernels, and Depth Map

FIG. 5 provides visual illustrations of some of the images, kernels, and depth maps used and/or generated by system 400. Specifically, FIG. 4 illustrates first sub-image 404 and second sub-image 406 each containing respective representations of object 500 and object 502. During image capture, object 500 may have been positioned within a depth of focus of the dual-pixel camera device, and thus appears in-focus in both first sub-image 404 and second sub-image 406. Object 502, on the other hand, may have been positioned outside of (e.g., beyond) the depth of focus of the dual-pixel camera device, and thus appears out-of-focus (i.e., blurry) in both first sub-image 404 and second sub-image 406. The difference in appearance of object 502 has been visually exaggerated, and a dotted reference line provided, to show the disparity between first sub-image 404 and second sub-image 406 due to object 502 being out-of-focus.

First blur kernel 416 and second blur kernel 418 are shown as having an approximately semi-circular shape, which may result from the dual-pixel camera device having a circular aperture. Other aperture shapes may give rise to differently-shaped blur kernels. First blur kernel 416 and second blur kernel 418 are not drawn to scale with first sub-image 404 and second sub-image 406. First blur kernel 416 and second blur kernel 418 are shown each having a radius of five pixels, which may represent the kernels at full scale (i.e., 1.0×). When first blur kernel 416 and/or second blur kernel 418 are scaled to, for example, 0.6×, the scaled first blur kernel 416 and/or second blur kernel 418 may instead have a radius of 3 pixels.

In-focus image 414 illustrates both object 500 and object 502 represented in-focus. Specifically, the appearance of object 500 has not been adjusted, since it was in-focus to begin with, but the appearance of object 502 has been adjusted as a result of convolutions of portions thereof with appropriately-sized blur kernels based on first blur kernel 416 and/or second blur kernel 418. In depth map 434, features that are closer to the dual-pixel camera device are indicated with a lighter color (with white representing a minimum depth), while features that are farther away indicated with a darker color (with black indicating a maximum depth). Thus, depth map 434 indicates that object 500 is closer to the dual-pixel camera device than object 502.

IX. Example Image and Kernel Model Parametrization

Figure 6:
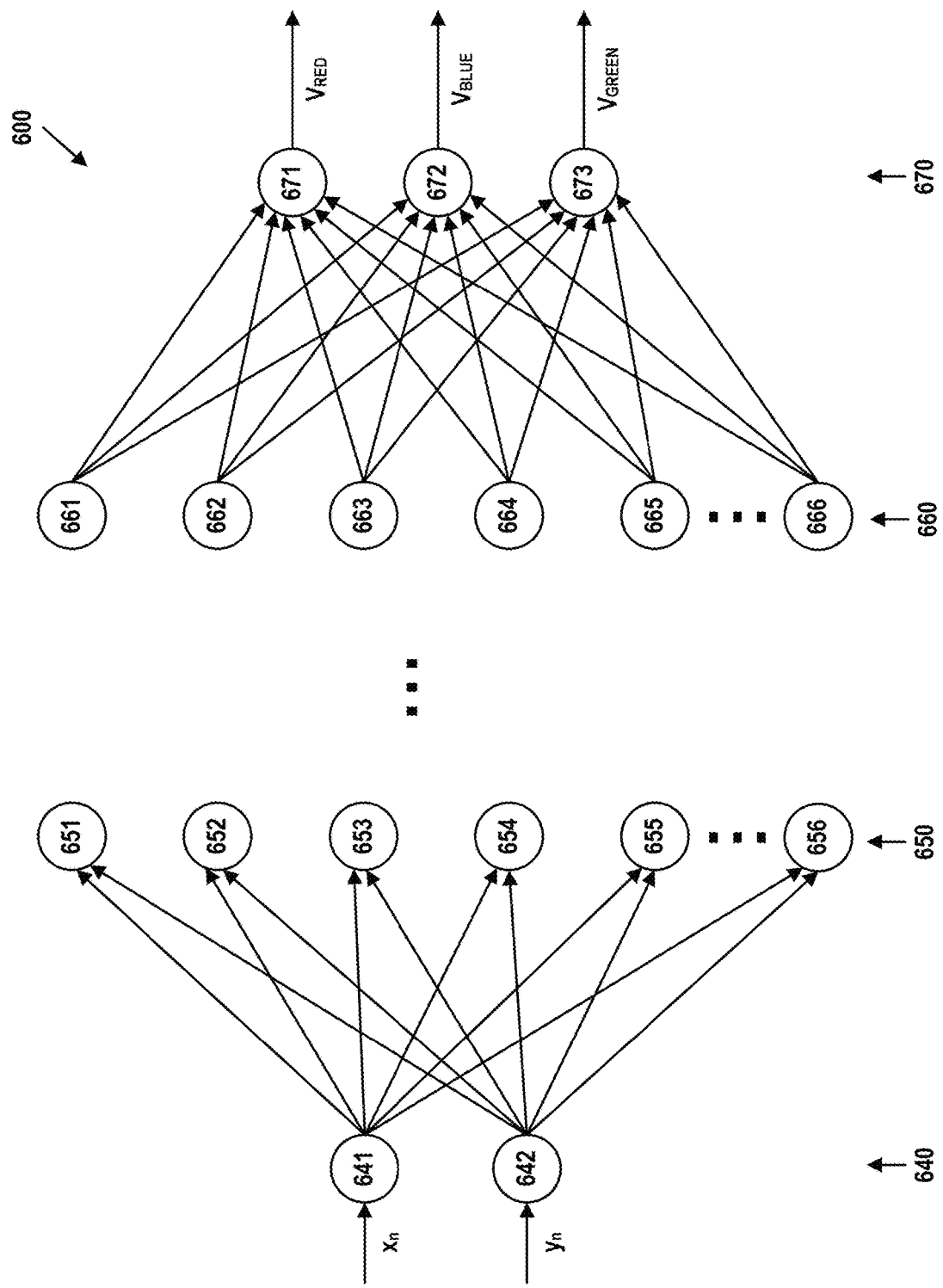
FIG. 6 illustrates an artificial neural network, in accordance with examples described herein.

FIG. 6 illustrates an example implementation of in-focus image model 408. Specifically, FIG. 6 illustrates in-focus image model 408 implemented as artificial neural network (ANN) 600, which may alternatively be referred to as a multilayer perceptron (MLP). ANN 600 includes input layer 640, hidden layers 650 through 660, and output layer 670. Input layer 640 includes input neurons 641 and 642. Hidden layer 650 includes neurons 651, 652, 653, 654, and 655 through 656. Hidden layer 660 includes neurons 661, 662, 663, 664, and 665 through 666. Output layer 670 includes neurons 671, 672, and 673. A given neuron may be configured to compute a weighted sum of outputs of the neurons in a preceding layer and apply an activation function to this computed sum, thereby generating an output of the given neuron.

ANN 600 may be configured to generate, for each pixel of in-focus image 414, a corresponding red-green-blue (RGB) pixel value. Specifically, ANN 600 may be configured to receive, at input layer 640, a set of pixel coordinates, with the horizontal coordinate of an nth pixel $x_n$ being provided to input neuron 641 and the vertical coordinate of the nth pixel $y_n$ being provided to input neuron 642. ANN 600 may be configured to generate, based on the horizontal and vertical coordinates $x_n$ and $y_n$, a corresponding red pixel value $V_{RED}$ at output neuron 671, a corresponding blue pixel value $V_{BLUE}$ at output neuron 672, and a corresponding green pixel value $V_{GREEN}$ at output neuron 673. Thus, when in-focus image 414 includes N pixels, ANN 600 may be used N times to generate, for each respective pixel n of the N pixels that form in-focus image 414, a corresponding RGB pixel value. Parameterizing in-focus image 414 using ANN 600 may be beneficial in that ANN 600 may, due to its structure, be inherently configured to generate image data that is realistic and spatially coherent.

In some implementations, ANN 600 or a modified version thereof may be used to implement first blur kernel model 410 and/or second blur kernel model 412. Specifically, in cases where each pixel of first blur kernel 416 and/or second blur kernel 418 is associated with a single value, rather than an RGB value, ANN 600 may be modified by including a single output neuron, rather than three output neurons. The modified ANN 600 may thus be configured to generate, based on the horizontal and vertical coordinates $x_n$ and $y_n$ of an nth pixel of first blur kernel 416 and/or second blur kernel 418, a corresponding pixel value $V_{BLUR}$ at output neuron 671. Thus, when first blur kernel 416 (or second blur kernel 418) includes M pixels, the modified ANN 600 may be used M times to generate, for each respective pixel n of the M pixels that form first blur kernel 416 (or second blur kernel 418), a corresponding pixel value.

Alternatively, in-focus image 414, first blur kernel 416, and/or second blur kernel 418 may be parameterized and generated using other mathematical models. In one example, in-focus image 414, first blur kernel 416, and/or second blur kernel 418 may be expressed using grid parametrization, with each pixel value represented directly and/or explicitly. Thus, in-focus image model 408, first blur kernel model 410, and/or second blur kernel model 412 may store, for example, a corresponding look-up table that defines and/or may be used to generate the values of the corresponding image, and these values may be directly adjusted during training of the models.

X. Additional Example Operations

Figure 7:
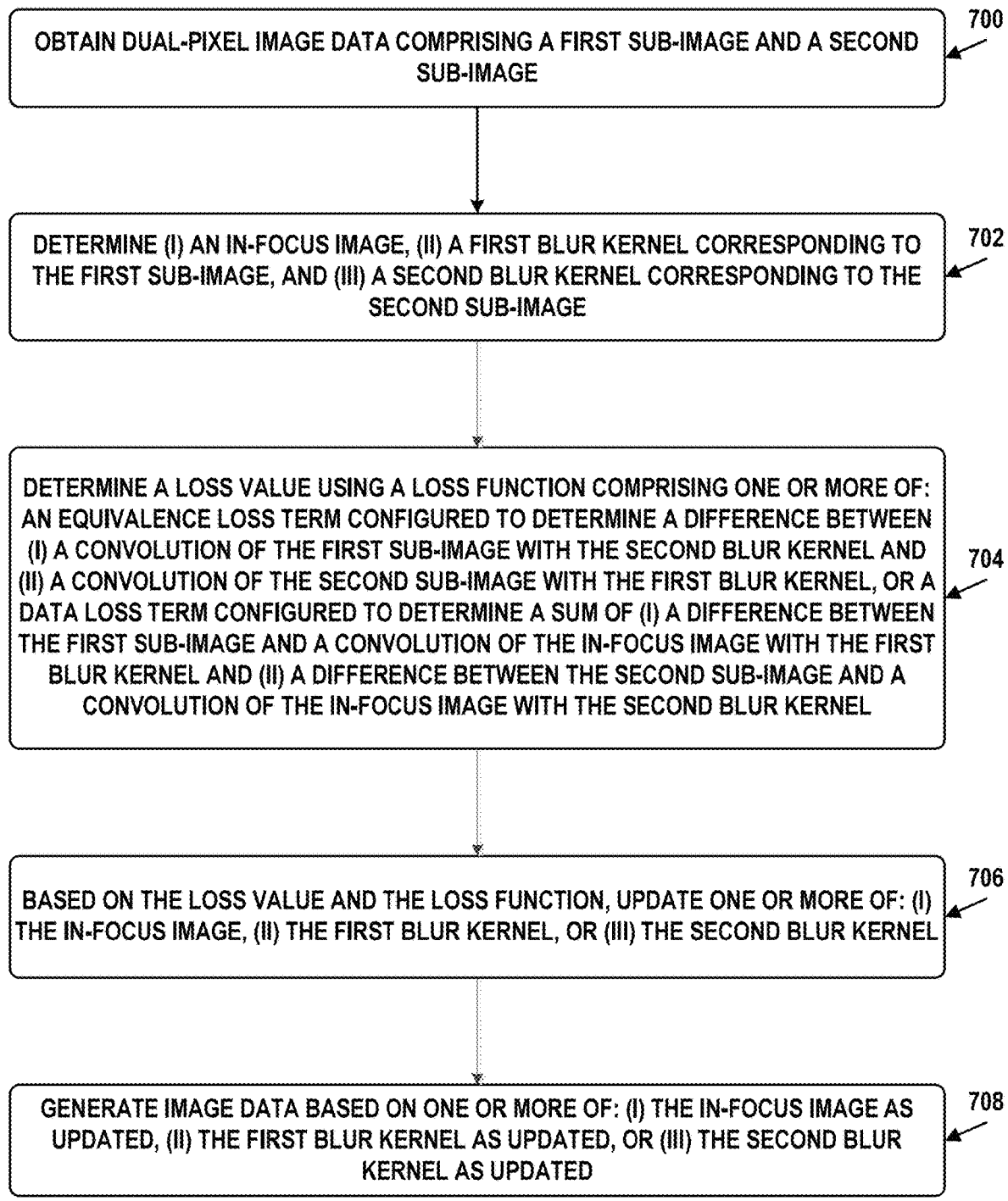
FIG. 7 illustrates a flow chart, in accordance with examples described herein.

FIG. 7 illustrates a flow chart of operations related to generating an in-focus image and/or blur kernels using dual-pixel image data. The operations may be carried out by and/or based on output of computing device 100, computing system 200, dual-pixel image sensor 300, and/or system 400, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may involve obtaining dual-pixel image data that includes a first sub-image and a second sub-image.

Block 702 may involve determining (i) an in-focus image, (ii) a first blur kernel corresponding to the first sub-image, and (iii) a second blur kernel corresponding to the second sub-image.

Block 704 may involve determining a loss value using a loss function that includes one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel.

Block 706 may involve, based on the loss value and the loss function, updating one or more of: (i) the in-focus image, (ii) the first blur kernel, or (iii) the second blur kernel.

Block 708 may involve generating image data based on one or more of: (i) the in-focus image as updated, (ii) the first blur kernel as updated, or (iii) the second blur kernel as updated.

In some embodiments, determining the loss value using the loss function may include receiving a first plurality of scaled blur kernels corresponding to a plurality of size scales. The first plurality of scaled blur kernels may be generated based on the first blur kernel. A second plurality of scaled blur kernels corresponding to the plurality of size scales may be received. The second plurality of scaled blur kernels may be generated based on the second blur kernel. A cost volume may be generated by determining, for each of the plurality of size scales, a respective result of one or more of the equivalence loss term or the data loss term. The loss value may be determined based on the cost volume.

In some embodiments, generating the cost volume by determining, for each of the plurality of size scales, the respective result of the equivalence loss term may include generating an equivalence loss cost volume by determining, for each of the plurality of size scales, a respective difference image based on a difference between (i) a convolution of the first sub-image with a corresponding blur kernel of the second plurality of scaled blur kernels and (ii) a convolution of the second sub-image with a corresponding blur kernel of the first plurality of scaled blur kernels. The loss value may include an equivalence loss value determined based on the equivalence loss cost volume.

In some embodiments, the respective difference image may have a height of H pixels and a width of W pixels. The plurality of size scales may include D size scales. A cross-section of the equivalence loss cost volume may include H pixels by W pixels, and a depth of the equivalence loss cost volume may include D pixels. Determining the equivalence loss value based on the equivalence loss cost volume may include selecting, for each respective pixel of the H pixels by W pixels of the cross-section of the equivalence loss cost volume, a minimum pixel value from D pixel values spatially corresponding to the respective pixel along the depth of the equivalence loss cost volume. The equivalence loss value may be determined based on a sum of the minimum pixel value selected for each respective pixel of the H pixels by W pixels of the cross-section of the equivalence loss cost volume.

In some embodiments, generating the cost volume by determining, for each of the plurality of size scales, the respective result of the data loss term may include generating a data loss cost volume by determining, for each of the plurality of size scales, a respective sum image based on a sum of (i) a difference between the first sub-image and a convolution of the in-focus image with a corresponding blur kernel of the first plurality of scaled blur kernels and (ii) a difference between the second sub-image and a convolution of the in-focus image with a corresponding blur kernel of the second plurality of scaled blur kernels. The loss value may include a data loss value determined based on the data loss cost volume.

In some embodiments, the respective sum image may have a height of H pixels and a width of W pixels. The plurality of size scales may include D size scales. A cross-section of the data loss cost volume may include H pixels by W pixels, and a depth of the data loss cost volume may include D pixels. Determining the data loss value based on the data loss cost volume may include selecting, for each respective pixel of the H pixels by W pixels of the cross-section of the data loss cost volume, a minimum pixel value from D pixel values spatially corresponding to the respective pixel along the depth of the data loss cost volume. The data loss value may be determined based on a sum of the minimum pixel value selected for each respective pixel of the H pixels by W pixels of the cross-section of the data loss cost volume.

In some embodiments, each of the plurality of size scales may be associated with a corresponding depth. A corresponding size scale of the plurality of size scaled may be selected based on the cost volume for each respective pixel of the in-focus image. A depth map associated with the dual-pixel image data may be generated based on the corresponding size scale selected for each respective pixel of the in-focus image.

In some embodiments, the loss function may include a depth loss term configured to compare (i) one or more features of the depth map to (ii) one or more corresponding features of the in-focus image.

In some embodiments, generating the image data based on the one or more of: (i) the in-focus image as updated, (ii) the first blur kernel as updated, or (iii) the second blur kernel as updated may include generating a re-focused image by modifying a depth of focus associated with at least part of the dual-pixel image data based on the depth map. The re-focused image may be displayed.

In some embodiments, each of the in-focus image, the first blur kernel, and the second blur kernel may be parametrized by and generated using a corresponding mathematical model. Updating the one or more of: (i) the in-focus image, (ii) the first blur kernel, or (iii) the second blur kernel may include determining a gradient of the loss function corresponding to the loss value and with respect to one or more parameters of one or more of the corresponding mathematical models. The one or more parameters of the one or more of the corresponding mathematical models may be updated based on the gradient of the loss function. The in-focus image as updated may be generated using the corresponding mathematical model as updated, the first blur kernel as updated may be generated using the corresponding mathematical model as updated, and/or the second blur kernel as updated may be generated using the corresponding mathematical model as updated.

In some embodiments, the mathematical model corresponding to the in-focus image may be specific to the dual-pixel image data such that a value of at least one parameter of the mathematical model corresponding to the in-focus image may differ from a value of a at least one corresponding parameter of a mathematical model corresponding to different dual-pixel image data.

In some embodiments, the corresponding mathematical model configured to parameterize and generate the in-focus image may include a first artificial neural network. Generating the in-focus image may include generating, by way of the first artificial neural network and for each respective pixel coordinate of the in-focus image, a corresponding pixel value based on the respective pixel coordinate of the in-focus image. Generating the in-focus image as updated may include generating, by way of the first artificial neural network as updated and for each respective pixel coordinate of the in-focus image as updated, an updated corresponding pixel value based on the respective pixel coordinate of the in-focus image as updated.

In some embodiments, the corresponding mathematical model configured to parameterize and generate a particular blur kernel of the first blur kernel and the second blur kernel may include a second artificial neural network. Generating the particular blur kernel may include generating, by way of the second artificial neural network and for each respective pixel coordinate of the particular blur kernel, a corresponding pixel value based on the respective pixel coordinate of the particular blur kernel. Updating the particular blur kernel may include generating, by way of the second artificial neural network as updated and for each respective pixel coordinate of the particular blur kernel as updated, an updated corresponding pixel value based on the respective pixel coordinate of the particular blur kernel as updated.

In some embodiments, determining the first blur kernel and the second blur kernel may include identifying a specific camera device that has been used to generate the dual-pixel image data, and obtaining, based on the specific camera device, the first blur kernel that has been calibrated for the specific camera device and the second blur kernel that has been calibrated for the specific camera device.

In some embodiments, the loss function may include a total variation denoising loss term configured to determine a total variation of one or more of (i) the in-focus image, (ii) the first blur kernel, or (iii) the second blur kernel.

In some embodiments, the loss function may include a deep convolutional prior loss term configured to determine a result of processing of one or more of (i) the in-focus image, (ii) the first blur kernel, or (iii) the second blur kernel by one or more artificial neural networks.

In some embodiments, the loss value may be updated using the loss function and based one or more of (i) the in-focus image as updated, (ii) the first blur kernel as updated, or (iii) the second blur kernel as updated. It may be determined that the loss value as updated is below a threshold loss value. Based on determining that the loss value as updated is below the threshold loss value, the image data based on the one or more of: (i) the in-focus image as updated, (ii) the first blur kernel as updated, or (iii) the second blur kernel as updated, may be generated.

In some embodiments, second dual-pixel image data comprising a third sub-image and a fourth sub-image may be obtained. A second in-focus image, a third blur kernel corresponding to the third sub-image, and/or a fourth blur kernel corresponding to the fourth sub-image may be determined. A second loss value may be determined using the loss function that includes one or more of: the equivalence loss term configured to determine a difference between (i) a convolution of the third sub-image with the fourth blur kernel and (ii) a convolution of the fourth sub-image with the third blur kernel, or the data loss term configured to determine a sum of (i) a difference between the third sub-image and a convolution of the second in-focus image with the third blur kernel and (ii) a difference between the fourth sub-image and a convolution of the second in-focus image with the fourth blur kernel. Based on the second loss value and the loss function, one or more of: (i) the second in-focus image, (ii) the third blur kernel, or (iii) the fourth blur kernel, may be updated. Second image data may be generated based on one or more of: (i) the second in-focus image as updated, (ii) the third blur kernel as updated, or (iii) the fourth blur kernel as updated. The second image data may be displayed.

XI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
obtaining dual-pixel image data comprising a first sub-image and a second sub-image;
determining (i) an in-focus image, (ii) a first blur kernel corresponding to the first sub-image, and (iii) a second blur kernel corresponding to the second sub-image;
determining a loss value using a loss function comprising one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel;

based on the loss value and the loss function, updating one or more of: (i) the in-focus image, (ii) the first blur kernel, or (iii) the second blur kernel; and generating image data based on one or more of: (i) the in-focus image as updated, (ii) the first blur kernel as updated, or (iii) the second blur kernel as updated.

2. The computer-implemented method of claim 1, wherein determining the loss value using the loss function comprises:

receiving a first plurality of scaled blur kernels corresponding to a plurality of size scales, wherein the first plurality of scaled blur kernels are generated based on the first blur kernel;

determining a second plurality of scaled blur kernels corresponding to the plurality of size scales, wherein the second plurality of scaled blur kernels are generated based on the second blur kernel;

generating a cost volume by determining, for each of the plurality of size scales, a respective result of one or more of the equivalence loss term or the data loss term; and determining the loss value based on the cost volume.

3. The computer-implemented method of claim 2, wherein generating the cost volume by determining, for each of the plurality of size scales, the respective result of the equivalence loss term comprises:

generating an equivalence loss cost volume by determining, for each of the plurality of size scales, a respective difference image based on a difference between (i) a convolution of the first sub-image with a corresponding blur kernel of the second plurality of scaled blur kernels and (ii) a convolution of the second sub-image with a corresponding blur kernel of the first plurality of scaled blur kernels, wherein the loss value comprises an equivalence loss value determined based on the equivalence loss cost volume.

4. The computer-implemented method of claim 3, wherein the respective difference image has a height of H pixels and a width of W pixels, wherein the plurality of size scales comprises D size scales, wherein a cross-section of the equivalence loss cost volume comprises H pixels by W pixels, wherein a depth of the equivalence loss cost volume comprises D pixels, and wherein determining the equivalence loss value based on the equivalence loss cost volume comprises:

selecting, for each respective pixel of the H pixels by W pixels of the cross-section of the equivalence loss cost volume, a minimum pixel value from D pixel values spatially corresponding to the respective pixel along the depth of the equivalence loss cost volume; and determining the equivalence loss value based on a sum of the minimum pixel value selected for each respective pixel of the H pixels by W pixels of the cross-section of the equivalence loss cost volume.

5. The computer-implemented method of claim 2, wherein generating the cost volume by determining, for each of the plurality of size scales, the respective result of the data loss term comprises:

generating a data loss cost volume by determining, for each of the plurality of size scales, a respective sum image based on a sum of (i) a difference between the first sub-image and a convolution of the in-focus image with a corresponding blur kernel of the first plurality of scaled blur kernels and (ii) a difference between the second sub-image and a convolution of the in-focus image with a corresponding blur kernel of the second plurality of scaled blur kernels, wherein the loss value comprises a data loss value determined based on the data loss cost volume.

6. The computer-implemented method of claim 5, wherein the respective sum image has a height of H pixels and a width of W pixels, wherein the plurality of size scales comprises D size scales, wherein a cross-section of the data loss cost volume comprises H pixels by W pixels, wherein a depth of the data loss cost volume comprises D pixels, and wherein determining the data loss value based on the data loss cost volume comprises:

selecting, for each respective pixel of the H pixels by W pixels of the cross-section of the data loss cost volume, a minimum pixel value from D pixel values spatially corresponding to the respective pixel along the depth of the data loss cost volume; and determining the data loss value based on a sum of the minimum pixel value selected for each respective pixel of the H pixels by W pixels of the cross-section of the data loss cost volume.

7. The computer-implemented method of claim 2, wherein each of the plurality of size scales is associated with a corresponding depth, and wherein the computer-implemented method further comprises:

selecting, for each respective pixel of the in-focus image, a corresponding size scale of the plurality of size scaled based on the cost volume; and generating a depth map associated with the dual-pixel image data based on the corresponding size scale selected for each respective pixel of the in-focus image.

8. The computer-implemented method of claim 7, wherein the loss function comprises a depth loss term configured to compare (i) one or more features of the depth map to (ii) one or more corresponding features of the in-focus image.

9. The computer-implemented method of claim 7, wherein generating the image data based on the one or more of: (i) the in-focus image as updated, (ii) the first blur kernel as updated, or (iii) the second blur kernel as updated comprises:

generating a re-focused image by modifying a depth of focus associated with at least part of the dual-pixel image data based on the depth map; and displaying the re-focused image.

10. The computer-implemented method of claim 1, wherein each of the in-focus image, the first blur kernel, and the second blur kernel is parametrized by and generated using a corresponding mathematical model, wherein updating the one or more of: (i) the in-focus image, (ii) the first blur kernel, or (iii) the second blur kernel comprises:

determining a gradient of the loss function corresponding to the loss value and with respect to one or more parameters of one or more of the corresponding mathematical models;

updating the one or more parameters of the one or more of the corresponding mathematical models based on the gradient of the loss function; and generating the one or more of: (i) the in-focus image as updated using the corresponding mathematical model as updated, (ii) the first blur kernel as updated using the corresponding mathematical model as updated, or (iii)

the second blur kernel as updated using the corresponding mathematical model as updated.

11. The computer-implemented method of claim 10, wherein the mathematical model corresponding to the in-focus image is specific to the dual-pixel image data such that a value of at least one parameter of the mathematical model corresponding to the in-focus image differs from a value of a at least one corresponding parameter of a mathematical model corresponding to different dual-pixel image data.

12. The computer-implemented method of claim 10, wherein:
the corresponding mathematical model configured to parameterize and generate the in-focus image comprises a first artificial neural network;
determining the in-focus image comprises generating, by way of the first artificial neural network and for each respective pixel coordinate of the in-focus image, a corresponding pixel value based on the respective pixel coordinate of the in-focus image; and
generating the in-focus image as updated comprises generating, by way of the first artificial neural network as updated and for each respective pixel coordinate of the in-focus image as updated, an updated corresponding pixel value based on the respective pixel coordinate of the in-focus image as updated.

13. The computer-implemented method of claim 10, wherein:
the corresponding mathematical model configured to parameterize and generate a particular blur kernel of the first blur kernel and the second blur kernel comprises a second artificial neural network;
determining the particular blur kernel comprises generating, by way of the second artificial neural network and for each respective pixel coordinate of the particular blur kernel, a corresponding pixel value based on the respective pixel coordinate of the particular blur kernel; and
updating the particular blur kernel comprises generating, by way of the second artificial neural network as updated and for each respective pixel coordinate of the particular blur kernel as updated, an updated corresponding pixel value based on the respective pixel coordinate of the particular blur kernel as updated.

14. The computer-implemented method of claim 1, wherein determining the first blur kernel and the second blur kernel comprises:
identifying a specific camera device that has been used to generate the dual-pixel image data; and
obtaining, based on the specific camera device, the first blur kernel that has been calibrated for the specific camera device and the second blur kernel that has been calibrated for the specific camera device.

15. The computer-implemented method of claim 1, wherein the loss function comprises a total variation denoising loss term configured to determine a total variation of one or more of (i) the in-focus image, (ii) the first blur kernel, or (iii) the second blur kernel.

16. The computer-implemented method of claim 1, wherein the loss function comprises a deep convolutional prior loss term configured to determine a result of processing of one or more of: (i) the in-focus image, (ii) the first blur kernel, or (iii) the second blur kernel by one or more artificial neural networks.

17. The computer-implemented method of claim 1, further comprising:

updating the loss value using the loss function and based one or more of (i) the in-focus image as updated, (ii) the first blur kernel as updated, or (iii) the second blur kernel as updated;
determining that the loss value as updated is below a threshold loss value; and
based on determining that the loss value as updated is below the threshold loss value, generating the image data based on the one or more of (i) the in-focus image as updated, (ii) the first blur kernel as updated, or (iii) the second blur kernel as updated.

18. The computer-implemented method of claim 1, further comprising:
obtaining second dual-pixel image data comprising a third sub-image and a fourth sub-image;
determining (i) a second in-focus image, (ii) a third blur kernel corresponding to the third sub-image, and (iii) a fourth blur kernel corresponding to the fourth sub-image;
determining a second loss value using the loss function comprising one or more of: the equivalence loss term configured to determine a difference between (i) a convolution of the third sub-image with the fourth blur kernel and (ii) a convolution of the fourth sub-image with the third blur kernel, or the data loss term configured to determine a sum of (i) a difference between the third sub-image and a convolution of the second in-focus image with the third blur kernel and (ii) a difference between the fourth sub-image and a convolution of the second in-focus image with the fourth blur kernel;
based on the second loss value and the loss function, updating one or more of: (i) the second in-focus image, (ii) the third blur kernel, or (iii) the fourth blur kernel; and
generating second image data based on one or more of: (i) the second in-focus image as updated, (ii) the third blur kernel as updated, or (iii) the fourth blur kernel as updated.

19. A system comprising:
a processor; and
a non-transitory computer-readable medium having stored thereon instructions that, when executed by the processor, cause the processor to perform operations comprising:
obtaining dual-pixel image data comprising a first sub-image and a second sub-image;
determining (i) an in-focus image, (ii) a first blur kernel corresponding to the first sub-image, and (iii) a second blur kernel corresponding to the second sub-image;
determining a loss value using a loss function comprising one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel;
based on the loss value and the loss function, updating one or more of: (i) the in-focus image, (ii) the first blur kernel, or (iii) the second blur kernel; and
generating image data based on one or more of: (i) the in-focus image as updated, (ii) the first blur kernel as updated, or (iii) the second blur kernel as updated.

20. A non-transitory computer-readable medium having stored thereon instructions that, when executed by a computing device, cause the computing device to perform operations comprising:
- obtaining dual-pixel image data comprising a first sub-image and a second sub-image;
- determining (i) an in-focus image, (ii) a first blur kernel corresponding to the first sub-image, and (iii) a second blur kernel corresponding to the second sub-image;
- determining a loss value using a loss function comprising one or more of: an equivalence loss term configured to determine a difference between (i) a convolution of the first sub-image with the second blur kernel and (ii) a convolution of the second sub-image with the first blur kernel, or a data loss term configured to determine a sum of (i) a difference between the first sub-image and a convolution of the in-focus image with the first blur kernel and (ii) a difference between the second sub-image and a convolution of the in-focus image with the second blur kernel:
- based on the loss value and the loss function, updating one or more of: (i) the in-focus image, (ii) the first blur kernel, or (iii) the second blur kernel; and
- generating image data based on one or more of: (i) the in-focus image as updated, (ii) the first blur kernel as updated, or (iii) the second blur kernel as updated.

* * * * *